(12) United States Patent
Kim et al.

(10) Patent No.: US 9,952,711 B2
(45) Date of Patent: Apr. 24, 2018

(54) ELECTRONIC DEVICE AND METHOD OF PROCESSING SCREEN AREA OF ELECTRONIC DEVICE

(71) Applicant: Samsung Electronics Co., Ltd., Suwon-si, Gyeonggi-do (KR)

(72) Inventors: Han-Sik Kim, Seoul (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 15/009,071

(22) Filed: Jan. 28, 2016

(65) Prior Publication Data

US 2016/0224176 A1 Aug. 4, 2016

(30) Foreign Application Priority Data

Jan. 30, 2015 (KR) .......................... 10-2015-0015278

(51) Int. Cl.
*G06F 3/041* (2006.01)
*G06F 1/16* (2006.01)
*G02B 27/01* (2006.01)
*H04N 13/04* (2006.01)

(52) U.S. Cl.
CPC ......... *G06F 3/0416* (2013.01); *G02B 27/017* (2013.01); *G06F 1/163* (2013.01); *G06F 1/169* (2013.01); *G06F 1/1654* (2013.01); *H04N 13/044* (2013.01); *H04N 13/0497* (2013.01); *G02B 2027/0141* (2013.01); *G02B 2027/0187* (2013.01); *H04N 2213/001* (2013.01)

(58) Field of Classification Search
CPC ...... G06F 3/0416; G06F 1/169; G06F 1/1654; G06F 1/163; H04N 13/044; H04N 13/0497; H04N 2213/001; G02B 27/017; G02B 2027/0187; G02B 2027/0141
See application file for complete search history.

(56) References Cited

U.S. PATENT DOCUMENTS

2009/0295753 A1* 12/2009 King ..................... G06F 1/1626
345/174
2013/0167078 A1* 6/2013 Monnig ................ G06F 3/0484
715/800
2014/0267637 A1* 9/2014 Hoberman ......... H04N 13/0429
348/53

FOREIGN PATENT DOCUMENTS

KR 10-1026411 B1 4/2011

* cited by examiner

*Primary Examiner* — Premal R Patel
(74) *Attorney, Agent, or Firm* — Jefferson IP Law, LLP

(57) ABSTRACT

An electronic device is provided. The electronic device includes a touch screen configured to display a screen corresponding to a wearable device, onto which the electronic device is mounted, in a first screen area of an entire screen area and to receive an input for controlling the first screen area, in a second screen area, which is different from the first screen area of the entire screen area and a processor configured to determine positions of the first screen area and the second screen area, and to control one or more operations related to the first screen area and the second screen area.

21 Claims, 25 Drawing Sheets

HORIZONTAL INSERTION

VERTICAL INSERTION

ELECTRONIC DEVICE AND METHOD OF PROCESSING SCREEN AREA OF ELECTRONIC DEVICE

CROSS-REFERENCE TO RELATED APPLICATION(S)

This application claims the benefit under 35 U.S.C. § 119(a) of a Korean patent application filed on Jan. 30, 2015 in the Korean Intellectual Property Office and assigned Serial number 10-2015-0015278, the entire disclosure of which is hereby incorporated by reference.

TECHNICAL FIELD

The present disclosure relates to an electronic device and a method of processing a screen area of an electronic device.

BACKGROUND

Among electronic devices, there are some which can be worn on bodies. In general, these wearable electronic devices are called wearable devices. These electronic devices which can be worn on bodies may include a head mounted electronic device such as a Head Mounted Display (HMD). The HMD may be largely divided into a see-through type which provides an Augmented Reality (AR) and a see-closed type which provides a Virtual Reality (VR).

The see-through type HMD may compose and combine virtual targets or objects based on the real world using characteristics of a semi-permeable lens to reinforce additional information which is difficult to acquire based on the real world alone. The see-closed type HMD is an electronic device having two displays which the user views, and may provide excellent immersion to the user since the user can enjoy contents (e.g., games, movies, streaming, broadcasts and the like) provided by an external input through an independent screen while being alone.

According to the existing technology, methods of using a wearable device to which a display device or an electronic device (for example, a smart phone) equipped with a display means is mounted have been researched.

When various sizes and forms of display devices are mounted on the wearable device, screen positions displayed on the display device may not accurately align with positions of the user's left and right eyes, and thus the user may be inconvenienced while using the device. In order to mechanically solve the problem of the un-aligned screen positions, the user can manually control the positions whenever the device is used. Accordingly, the user may be inconvenienced and a structure of the device may become complex. Further, when the display device moves due to a physical impact, the position of the display device changes and thus may not be properly aligned with the user's eyes.

Moreover, when a wearable device equipped with various sizes and forms of electronic devices or display devices is used, an area other than the screen displayed to correspond to the wearable device cannot be used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which, when a display device is mounted to a wearable device, can distinguishably use a screen area displayed to correspond to the wearable device and the remaining screen areas, and a method of processing the screen area of the electronic device.

In accordance with an aspect of the present disclosure, an electronic device is provided. The electronic device includes a touch screen configured to display a screen corresponding to a wearable device, onto which the electronic device is mounted, in a first screen area of an entire screen area, and to receive an input for controlling the first screen area, in a second screen area, which is different from the first screen area of the entire screen area and a processor configured to determine positions of the first screen area and the second screen area and to control one or more operations related to the first screen area and the second screen area.

In accordance with another aspect of the present disclosure, a method of processing a screen area of an electronic device is provided. The method includes mounting the electronic device onto a wearable device, determining, by a processor, a first screen area corresponding to the wearable device among all screen areas of a touch screen included in the electronic device, determining at least some areas, of all of the screen areas except for the first screen area, as a second screen area; displaying a screen corresponding to the wearable device in the first screen area, and providing one or more functions in the second screen area.

An electronic device and a method of controlling a display of the electronic device according to an embodiment can control screen positions to fit the user without a separate control when a display device having various forms and sizes is mounted on a wearable device.

According to an embodiment of the present disclosure, by mounting a display device (for example, a smart phone) having different sizes and forms on a wearable device, the wearable device can be used as a Head Mounted Display (HMD) device.

According to an embodiment of the present disclosure, by storing a setting value of a screen position based on each user, an optimal screen position suitable for the user can be provided.

According to an embodiment of the present disclosure, even though a position of a display device changes due to a mechanical defect of a wearable device or a physical impact, a screen position can be corrected in real time through recognition of a reference point in a current state.

According to an embodiment of the present disclosure, by determining and displaying accurate left and right screen display positions in a Head Mounted Theater (HMT) mode, motion blur which may be generated in the HMD device can be reduced.

According to an embodiment of the present disclosure, when the electronic device is mounted on the wearable device, the screen of the electronic device may be divided into a screen area displayed to correspond to the wearable device and the remaining screen area and the divided areas may be used.

According to an embodiment of the present disclosure, when the electronic device is mounted on the wearable device, various functions may be provided through the screen area displayed to correspond to the wearable device and the remaining screen area. For example, according to an embodiment of the present disclosure, various control functions related to the HMT mode may be provided using the remaining screen area. For example, according to an embodiment of the present disclosure, various pieces of information related to the HMT mode may be provided using the remaining screen area.

According to an embodiment of the present disclosure, a large size virtual space can be provided by placing a screen of the electronic device to be suitable for user's eyes when the display device is mounted on the wearable device, limitations on various functions (for example, a touch input, gesture recognition, illumination recognition and the like) provided by the electronic device when a virtual space is provided can be solved, and an intuitive and differentiated user experience (UX) for HMT can be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
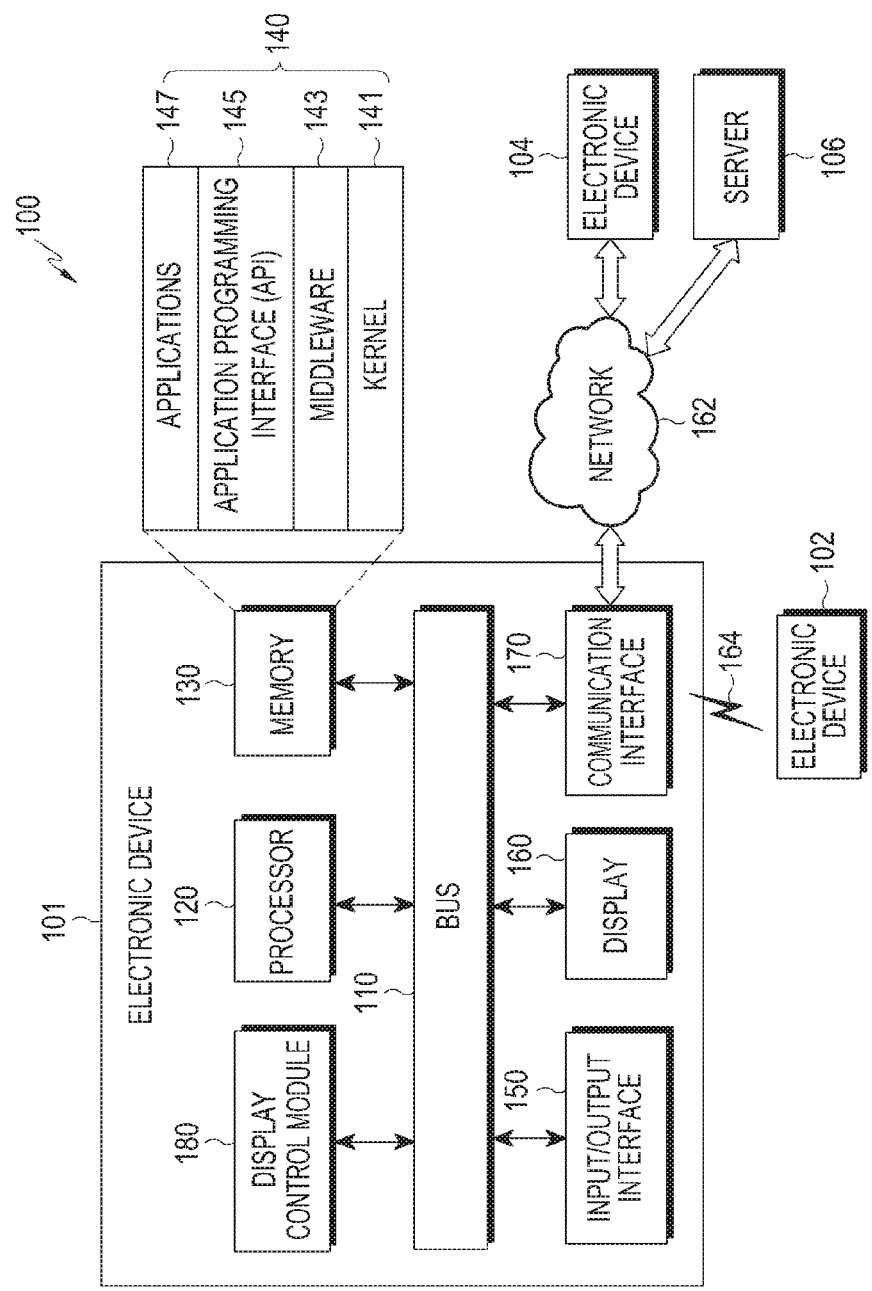
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "have," "may have," "include," and/or "may include" refer to an existence of a corresponding feature (e.g., numerical value, function, operation, or components such as elements), and do not exclude existence of additional features.

In the present disclosure, the expressions "A or B," "at least one of A or/and B," and/or "one or more of A or/and B" may include all possible combinations of the items listed. For example, the expressions "A or B," "at least one of A and B," or "at least one of A or B" refer to all of (1) including at least one A, (2) including at least one B, and/or (3) including all of at least one A and at least one B.

The expressions "a first," "a second," "the first," and/or "the second" used in various embodiments of the present disclosure may modify various components regardless of the order and/or the importance but do not limit the corresponding components. The expressions may be used to distinguish a component element from another component element. For example, a first user device and a second user device may indicate different user devices regardless of the sequence or importance thereof. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expressions "configured to" used in the present disclosure may be exchanged with, for example, "suitable for," "having the capacity to," "designed to," "adapted to," "made to," and/or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disc (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, and/or Google TV™), a game console (e.g., Xbox™ and/or PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), an avionic device, a security device, an automotive head unit, a robot for home or industry, an automatic teller's machine (ATM) of a bank, point of sales (POS) equipment of a shop, and/or an internet device of things (e.g., a light bulb, various sensors, an electric or gas meter, a sprinkler device, a fire alarm, a thermostat, a streetlamp, a toaster, sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. The term "user" used in the present specification may refer to a person or a device (for example, an artificial intelligence electronic device) using an electronic device.

Specifically, FIGS. 1 through 33, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment according to an embodiment of the present disclosure.

Referring to FIG. 1, a network environment 100 including an electronic device 101 is illustrated.

The electronic device 101 may include at least one of a bus 110, a processor 120, a memory 130, an input/output interface 150, a display 160, a communication interface 170, and a display control module 180. In some embodiments, at least one of the components of the electronic device 101 may be omitted, or other components may be additionally included in the electronic device 101.

The bus 110 may include, for example, a circuit for connecting the various components 120, 130, 150, 160, 170 and 180 with each other and transferring communication (for example, a control message and/or data) between the various components 120, 130, 150, 160, 170 and 180.

The processor 120 may include one or more of a Central Processing Unit (CPU), an AP, and a Communication Processor (CP). For example, the processor 120 may carry out calculations or data processing related to control and/or communication of at least one other component of the electronic device 101.

The memory 130 may include a volatile memory and/or a non-volatile memory. The memory 130 may store, for example, commands or data related to one or more other components of the electronic device 101. According to one embodiment, the memory 130 may store software and/or a program 140. For example, the program 140 may include a kernel 141, middleware 143, an Application Programming Interface (API) 145, and/or application programs (e.g., applications) 147. At least some of the kernel 141, the middleware 143, and the API 145 may be referred to as an Operating System (OS).

For example, the kernel 141 may control or manage system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access individual components of the electronic device 101 to control or manage system resources.

For example, the middleware 143 may serve as a relay for allowing the API 145 or the application programs 147 to communicate with the kernel 141 to exchange data. Furthermore, with regard to task requests received from the application programs 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is an interface through which the applications 147 control functions provided by the kernel 141 or the middleware 143, and may include at least one interface or function (for example, an instruction) for file control, window control, image processing, or text control.

For example, the input/output interface 150 may serve as an interface that may transfer instructions or data, which is input from a user or another external device, to the other components of the electronic device 101. Further, the input/output interface 150 may output commands or data received from other component(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen and receive, for example, a touch input, a gesture input, a proximity input, or a hovering input using an electronic pen or a user's body part.

The communication interface 170 may configure communication between, for example, the electronic device 101 and an external device (for example, an electronic device 102, an electronic device 104, and/or a server 106). For example, the communication interface 170 may be connected to a network 162 through wireless or wired communication to communicate with the external device (for example, the external electronic device 104 and/or the server 106). Further, the communication interface 170 may communicate to the external electronic device 102 by short-range communication 164, such as, for example, Bluetooth (BT) and Near Field Communications (NFC).

The wireless communication may include, for example, at least one of long term evolution (LTE), LTE advanced (LTE-A), code division multiple access (CDMA), wideband CDMA (WCDMA), universal mobile telecommunications system (UMTS), wireless broadband (WiBro), and global system for mobile (GSM) as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a local area network (LAN) and/or a wide area network (WAN)), the Internet, and a telephone network.

Each of the external electronic devices 102 and 104 may be a device which is the same type as the electronic device or a different type from the electronic device 101. According to an embodiment of the present disclosure, the server 106 may include a group of one or more servers. According to an embodiment of the present disclosure, all or some of the operations executed by the electronic device 101 may be executed by another electronic device or a plurality of electronic devices (for example, the electronic device 102 and/or 104, and/or the server 106). According to an embodiment of the present disclosure, when the electronic device 101 has to perform any function or service automatically or in response to a request, the electronic device 101 may make a request for at least some functions related to the function or service to the other device (for example, the electronic device 102 and/or 104 and/or the server 106), instead of autonomously executing the function or service or in addition. The other electronic devices (for example, the electronic device 102 and/or 104 and/or the server 106) may carry out the requested function or an additional function and transfer the result, obtained by carrying out the function, to the electronic device 101. The electronic device 101 may provide the requested functions or services based on the received result or after additionally processing the received result. To this end, for example, a cloud computing, distributed computing, or client-server computing technology may be used.

Although the electronic device 101 includes the communication interface 170 to communicate with the external electronic device 104 and/or the server 106 through the network 162, as illustrated in FIG. 1, the electronic device 101 may be implemented to independently operate therein without a separate communication function according to an embodiment of the present disclosure.

According to an embodiment of the present disclosure, the server 106 may support driving the electronic device 101 by conducting at least one of the operations (or functions) performed by the electronic device 101. For example, the server 106 may include a display control server module (not shown) capable of supporting the display control module 180 implemented in the electronic device 101. For example, the display control server module may include one or more components of the display control module 180, and may perform at least one of the operations (or functions) performed by the display control module 180 (or on behalf of the display control module 180).

The display control module 180 may process at least some of pieces of information obtained from other components (for example, the processor 120, the memory 130, the input/output interface 145, and/or the communication interface 160) and provide the processed information to the user in various ways.

For example, when the electronic device 101 is installed in a wearable device and functions as a display device according to an embodiment of the present disclosure, the display control module 180 may control an area or a position of a screen displayed through the display 160. Additional information regarding the display control module 180 is provided through FIG. 2 described below.

Although the display control module 180 is illustrated as a module separated from the processor 120 in FIG. 1, at least a part of the display control module 180 may be included in the processor 120 or at least one other module, and all of the functions of the display control module 180 may be included and implemented in the illustrated processor 120 or another processor.

Figure 2:
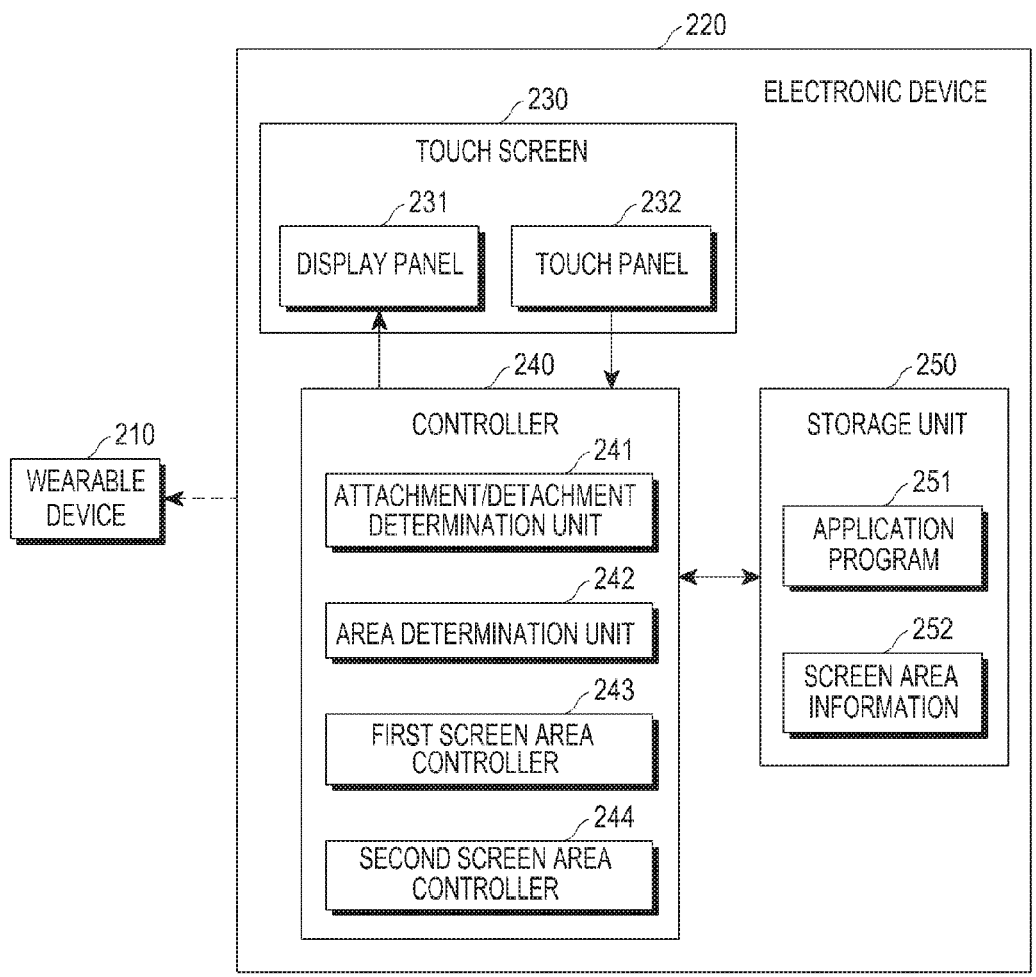
FIG. 2 illustrates an example of a configuration of an electronic device according to an embodiment of the present disclosure.

FIG. 2 illustrates an example of a configuration of an electronic device according to an embodiment of the present disclosure.

Referring to FIG. 2, an electronic device 220 is illustrated, where the electronic device 220 may have one or more display means. In the following description, the electronic device 220 may be a device having a display function as a main function or may be a general electronic device including one or more display means. For example, the electronic device 220 may be an electronic device (for example, a smart phone) including a touch screen 230.

The electronic device 220 according to an embodiment of the present disclosure may include at least one of the touch screen 230, a controller 240, and a storage unit 250. The touch screen 230 may include a display panel 231 and/or a touch panel 232. The controller 240 may include at least one of an attachment/detachment determination unit 241, an area detection unit 242, a first screen area controller 243, and a second screen area controller 244.

When the electronic device 220 is close to, contacts, fixed to, or mounted to a wearable device 210, the electronic device 220 may operate as, for example, a head mounted device (HMD). According to an embodiment of the present disclosure, the position or size of a Head Mounted Theater (HMT) mode screen displayed through the display panel 231 of the electronic device 220 may be controlled to be suitable for a user who wears the wearable device 210. For example, when the electronic device 220 is mounted on the wearable device 210 to operate in the HMT mode, the HMT mode screen displayed through the display panel 231 may display two screens corresponding to a left eye and a right eye of the user (for example, see FIG. 7).

When the electronic device 220 operates in the HMT mode according to an embodiment of the present disclosure, the controller 240 may sense contact of the wearable device 210 on which the electronic device 220 is mounted through various methods to detect a reference point and determine an area or a position of the screen displayed in the HMT mode based on the detected reference point. Embodiments therefor will be described below with reference to FIGS. 8 and 9.

According to an embodiment of the present disclosure, when the electronic device 220 is mounted on the wearable device 210 to operate in the HMD mode, the touch panel 232 included in the electronic device 220 may detect a reference point through contact with one or more conductive parts (for example, capacitive materials) arranged on a front surface portion of the wearable device 210 which contacts with the touch screen 230 of the electronic device 220. For example, when the electronic device 220 is mounted on the wearable device 210, as the touch panel 232 makes contact with the wearable device 210, the conductive parts included in the wearable device 210 are detected at particular positions of the touch panel 232. Accordingly, a position where the electronic device 220 is mounted on the wearable device 210 can be determined.

When the reference point is detected from the wearable device 210, the area determination unit 242 may determine positions of the screens (for example, a display position of a left screen corresponding to the left eye and a display position of a right screen corresponding to the right eye) to be displayed according to the HMT mode based on the detected reference point. Further, according to an embodiment of the present disclosure, the size of the screens to be displayed based on the HMT mode may be determined. Hereinafter, for convenience of description, a screen area displayed in the HMT mode among the whole display screen on the display panel 231 may be referred to as a "first screen area." Further, at least some of the remaining screen areas except for the first screen area among the whole display screen on the display panel 231 is referred to as a "second screen area."

According to an embodiment of the present disclosure, whether the electronic device 220 operates in the HMT mode may be determined by the execution of the HMT mode by the user or determined by the attachment/detachment determination unit 241. For example, when the electronic device 220 is mounted on the wearable device 210, the attachment/detachment determination unit 241 may determine that the electronic device 220 is mounted on the wearable device 210 and switch the electronic device 220 to the HMT mode.

Further, according to an embodiment of the present disclosure, the attachment/detachment determination unit 241 may determine that the electronic device 220 is not normally mounted on the wearable device 210 based on a result of the detection of the reference point, and the electronic device 220 or the wearable device 210 may notify the user of a result of the determination through a sound, vibration, or screen display. For example, when it is determined that the electronic device 220 is not properly mounted on the wearable device 210 and thus the screen cannot be normally displayed for the user based on the result of the detection of the reference point, the attachment/detachment determination unit 241 may inform the user that the electronic device 220 is not normally mounted without determining the positions of the screens to be displayed.

First screen area information or second screen area information determined through the area determination unit 242 may be stored in the storage unit 250 as screen area information 252. When the screen area information 252 stored in the storage unit 250 may be stored according to each user and the user of the electronic device 220 changes, screen position information suitable for the changed user may be read and applied to the screen display. Further, the screen area information 252 may be stored according to each type of electronic device 220 or wearable device 210.

The storage unit 250 may store application programs 251, and the application programs 251 may be applications related to an HMT mode operation of the electronic device 220. For example, according to an embodiment of the present disclosure, when the user executes the application program 251 related to the HMT mode operation, the area determination unit 242 may detect the reference point from the wearable device 210 to determine the first screen area or the second screen area.

The wearable device 210 may be a predetermined electronic device including one or more functions of the electronic device 101 illustrated in FIG. 1, or may be a wearable holder for simply holding the electronic device 220. When the wearable device 210 is an electronic device, if the electronic device 220 is mounted on the wearable device 210, various functions may be provided through communication with the electronic device 220. For example, when the electronic device 220 is mounted on the wearable device 210, the electronic device 220 may detect whether the electronic device 220 is mounted on the wearable device 210 through communication with the wearable device 210 and determine whether to operate in the HMT mode.

According to an embodiment of the present disclosure, when the electronic device 220 is mounted on the wearable device 210, if the mounting of the electronic device 220 cannot be automatically determined, the user may apply an embodiment of the present disclosure by execution of the application program 251 or selection of the HMT mode. Further, according to an embodiment of the present disclosure, when the wearable device 210 includes functions of the electronic device 101, the attachment/detachment determination unit 241 of the electronic device 220 may automatically determine whether the electronic device 220 is mounted on the wearable device 210 to automatically switch to the HMT mode.

According to embodiment of the present disclosure, when the electronic device 220 operates in the HMT mode in a state where the electronic device 220 is mounted on the wearable device 210, a function of updating display positions of screens may be performed by (again) determining screen areas or positions through the detection of the reference point at a preset time interval, in real time, or when a preset condition is met. Information regarding the updated screen positions may be stored in the storage unit 250. For example, when a mounting position of the electronic device 220 changes due to an external impact while the user is watching the screen in the HMT mode in a state where the electronic device 220 is mounted on the wearable device 210, a screen suitable for the changed mounting position may be provided through the update of the screen positions.

When the first screen area and the second screen area are determined by the area determination unit 242, the first screen area controller 243 may control the determined first screen area and the second screen area controller 244 may control the determined second screen area.

For example, the first screen area controller 243 may display a screen corresponding to the HMT mode in the determined first screen area among the whole area of the display panel 231.

Further, according to an embodiment of the present disclosure, the second screen area controller 244 may use, as an input area for controlling the first screen area, the determined second screen area (for example, at least some of the remaining screen areas except for the first screen area) among the whole area of the display panel 231.

For example, when a user's touch or gesture is detected within an area corresponding to the second screen area among the whole area of the touch panel 232 included in the touch screen 230, the second screen area controller 244 may perform a preset input function (for example, a function for controlling the HMT mode in the second screen area).

Further, according to an embodiment of the present disclosure, the second screen area controller 244 may use, as a separate display area, the determined second screen area among the whole area of the display panel 231. For example, the second screen area controller 244 may display, on the second screen area, various soft keys (for example, play, pause, stop, fast forward, rewind, volume control, and the like) for controlling the HMT mode. Further, according to an embodiment of the present disclosure, the second screen area controller 244 may provide the second screen area with various pieces of information (for example, one or more icons for executing applications, weather information, information regarding the day of the week, schedule information, call reception information, text message reception information, information regarding various statuses, news information, and the like) provided by the electronic device 220 separately from the HMT mode.

At least some of the functions of the controller 240 illustrated in FIG. 2 may be included in the display control module 180 or the processor 120 of the electronic device 101 illustrated in FIG. 1. Further, the touch screen 230 or the display panel 231 illustrated in FIG. 2 may correspond to the display 160 of FIG. 1. The storage unit 250 illustrated in FIG. 2 may correspond to the memory 130 illustrated in FIG. 1.

Although the display panel 231 and the touch panel 232 are illustrated as the touch screen 230 in FIG. 2, the display panel 231 and the touch panel 232 may be implemented in a separate panel form rather than a form of one touch screen 230 according to an embodiment.

Further, according to an embodiment of the present disclosure, the electronic device 220 may be referred to as a first device (or a first electronic device) and the wearable device 210 may be referred to as a second device (or a second electronic device for convenience of description.

The electronic device 220 according to one of the an embodiment of the present disclosure may include a touch screen 230 for displaying a screen corresponding to a wearable device 210 on which the electronic device 220 is mounted, in a first screen area of an entire screen area and receiving an input for controlling the first screen area in a second screen area different from the first screen area of the entire screen area, and may a processor for determining positions of the first screen area and the second screen area and controlling one or more operations related to the first screen area and the second screen area.

According to an embodiment of the present disclosure, the first screen area may provide a function corresponding to an HMT mode.

According to an embodiment of the present disclosure, the determination of the positions of the first screen area and the second screen area may be performed by one or more reference points detected by the wearable device 210 on which the electronic device 220 is mounted.

According to an embodiment of the present disclosure, the reference point may be detected from one or more conductive parts arranged on a front surface of the wearable device 210 on which the electronic device 220 is mounted.

According to an embodiment of the present disclosure, the conductive parts may be formed in a circular form in the circumference of a lens unit arranged on the front surface of the wearable device 210 on which the electronic device 220 is mounted.

According to an embodiment of the present disclosure, the processor may provide one or more functions which can be provided by the electronic device 220 through the second screen area.

According to an embodiment of the present disclosure, the processor may display one or more of call reception information, text message reception information, information regarding various statuses, weather information, and news information in the second screen area.

According to an embodiment of the present disclosure, the processor may provide one or more functions for controlling a function corresponding to the first screen area through the second screen area.

According to an embodiment of the present disclosure, the processor may display information received from an external second electronic device through the second screen area.

According to an embodiment of the present disclosure, the processor may apply different screen configurations to the first screen area and the second screen area.

According to an embodiment of the present disclosure, the screen configurations may correspond to one or more of a resolution, a refresh rate, and brightness.

According to an embodiment of the present disclosure, the electronic device 220 may further include a sub touch pad in a bezel area adjacent to the touch screen 230, and the processor may control one or more functions corresponding to the first screen area in response to a user input through the sub touch pad.

According to an embodiment of the present disclosure, the electronic device 220 may further include a first touch screen for providing a function corresponding to the first screen area, and a second touch screen for providing a function corresponding to the second screen area.

Figure 3:
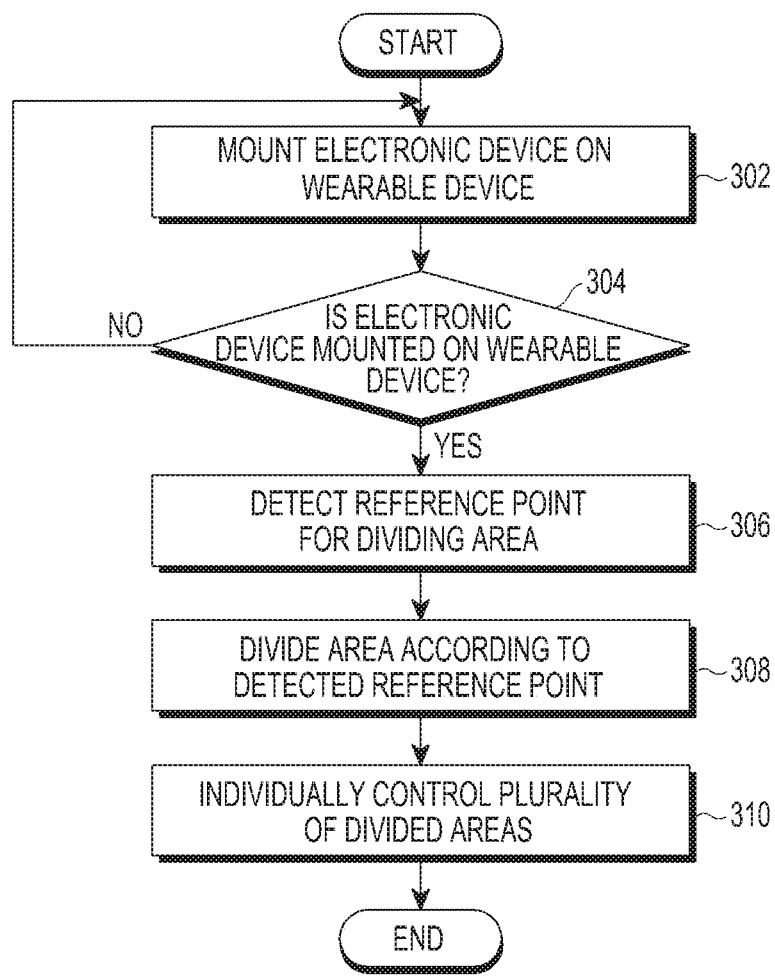
FIG. 3 is a flowchart illustrating a screen area control process of an electronic device according to an embodiment of the present disclosure.

FIG. 3 is a flowchart illustrating a screen area control process of an electronic device according to an embodiment of the present disclosure.

Referring to FIG. 3, a flowchart is illustrated, such that in operation 302, an electronic device may be mounted on a wearable device. When it is identified that the electronic device is mounted on the wearable device in operation 304, a reference point for dividing the area may be detected in operation 306. The identification of whether the electronic device is mounted on the wearable device may be implemented through various methods. For example, when a connection unit of the wearable device is connected to a connection unit of the electronic device (for example, a Universal Serial Bus (USB)), the wearable device or the electronic device may detect the connection and determine that the electronic device is mounted on the wearable device.

When, in operation 304, it is identified that the electronic device is not mounted on the wearable device, the flowchart returns to operation 302.

In operation 308, the electronic device may divide the whole screen area into a first screen area and a second screen area according to the detected reference point.

In operation 310, the electronic device may individually control the first screen area and the second screen area which have been divided.

For example, a screen according to an HMT mode may be displayed in the divided first screen area, and a keypad for controlling the screen according to the HMT mode may be displayed in the second screen area. Further, according to an embodiment of the present disclosure, the second screen area receives a user's touch or gesture to control the screen according to the HMT mode. In addition, according to an embodiment of the present disclosure, various pieces of information (for example, call reception information, text message reception information, information regarding various statuses, weather information, news information, and the like) which can be displayed on the screen of the electronic device may be displayed in the second screen area.

At least one of the operations illustrated in FIG. 3 may be omitted, or at least one other operation may be added between the operations. In addition, the operations may be sequentially processed as illustrated in FIG. 3, and the execution sequence of at least one operation may be switched with that of another operation. Furthermore, the operations illustrated in FIG. 3 may be performed in the electronic device or a server. At least one of the operations illustrated in FIG. 3 may be performed within the electronic device and the remaining operations may be performed by the server.

A method of operating an electronic device according to an embodiment of the present disclosure may include mounting the electronic device on a wearable device and determining a first screen area corresponding to the wearable device among all screen areas of a touch screen included in the electronic device, determining at least some areas of all of the screen areas except for the first screen area as a second screen area, displaying a screen corresponding to the wearable device in the first screen area, and providing one or more functions in the second screen area.

According to an embodiment of the present disclosure, the first screen area may provide a function corresponding to an HMT mode.

According to an embodiment of the present disclosure, determination of positions of the first screen area and the second screen area may be performed based on one or more reference points detected by the wearable device on which the electronic device is mounted.

According to an embodiment of the present disclosure, the reference point may be detected from one or more conductive parts arranged on a front surface of the wearable device on which the electronic device is mounted.

According to an embodiment of the present disclosure, the method may further include providing one or more functions which can be provided by the electronic device, through the second screen area.

According to an embodiment of the present disclosure, the method may further include displaying one or more of call reception information, text message reception information, information regarding various statuses, weather information, and news information in the second screen area.

According to an embodiment of the present disclosure, the method may further include providing one or more functions for controlling a function corresponding to the first screen area through the second screen area.

According to an embodiment of the present disclosure, the method may further include receiving information from an external second electronic device, and displaying the received information through the second screen area.

According to an embodiment of the present disclosure, screen configurations applied to the first screen area and the second screen area may be different.

According to an embodiment of the present disclosure, the screen configurations may correspond to one or more of a resolution, a refresh rate, and brightness.

According to an embodiment of the present disclosure, the method may further include receiving a user input through a sub touch pad arranged in a bezel area adjacent to the touch screen, and executing one or more functions corresponding to the first screen area in response to a user input through the sub touch pad.

Hereinafter, an example in which an electronic device (for example, a smart phone) is mounted on a wearable device will be described with reference to FIGS. 4 to 6.

Figure 4:
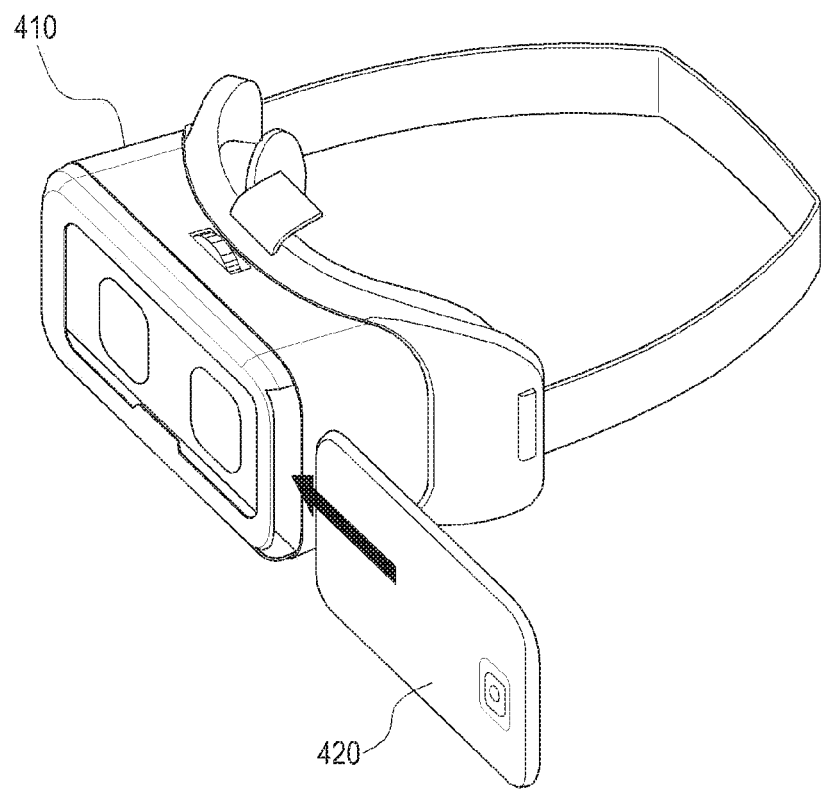
FIG. 4 illustrates an example of a head mounted electronic device according to an embodiment of the present disclosure.

FIG. 4 illustrates an example of a wearable device according to an embodiment of the present disclosure.

Referring to FIG. 4, a wearable device 410 is illustrated, where the wearable device 410 may be, for example, the electronic device 101 of FIG. 1. Further, as described above, the wearable device 410 may provide only a function of a simple holder which does not have a function of communicating with an electronic device 420. The wearable device 410 may include a main body and a cover.

When the electronic device 420 is mounted on the wearable device 410, the cover may cover a rear edge of the electronic device 420 to be fixed to the wearable device 410 in order to maintain a mounted state of the electronic device 420 as illustrated in FIG. 4. The wearable device 410 may include a support which can be used when the user puts the wearable device 410 on his/her head.

Further, a plurality of lenses may be located at positions in the wearable device 410 corresponding to both eyes of the wearer. The wearer may view a display (not shown) of the electronic device 420 through the lenses in a state where the electronic device 420 is mounted on the wearable device 410. The wearable device 410 may have a mechanical structure to/from which the electronic device 420 can be attached/detached as illustrated in FIG. 4.

According to an embodiment of the present disclosure, the wearable device 410 may include one or more of the components of the electronic device 101 of FIG. 1. For example, the wearable device 410 may include at least one of a touch panel, a button, a wheel key, and a touch pad. The touch panel may receive a touch input by the user. The touch input may be a direct touch input on the touch panel or a hovering input approaching the touch panel. When the electronic device 420 is mounted on the wearable device 410, the wearable device 410 may be connected to communicate with the electronic device 420 through an interface such as a USB.

The electronic device 420 may control a function corresponding to an input in response to the input received from the wearable device 410. For example, the electronic device 420 may control a volume or a screen (for example, an image reproduction screen in the HMT mode) in response to the received input.

Figure 5:
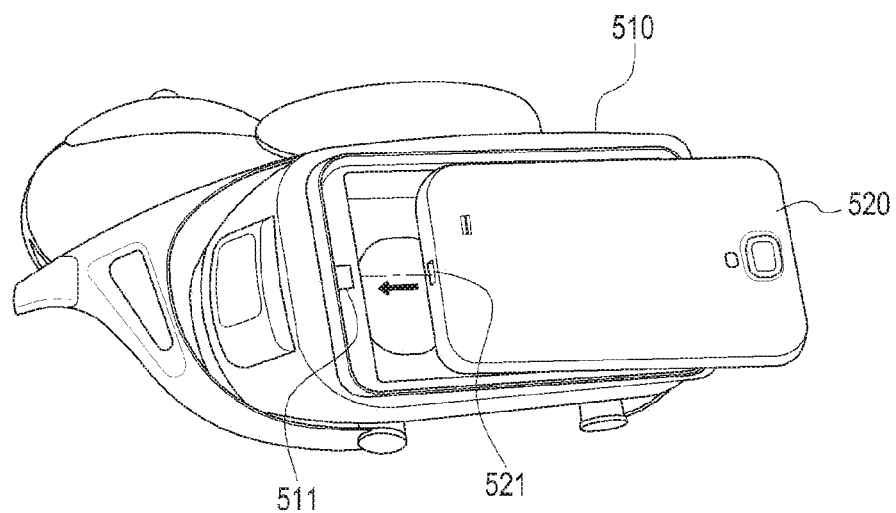
FIG. 5 illustrates an example in which an electronic device is mounted on a wearable device according to an embodiment of the present disclosure.
Figure 6:
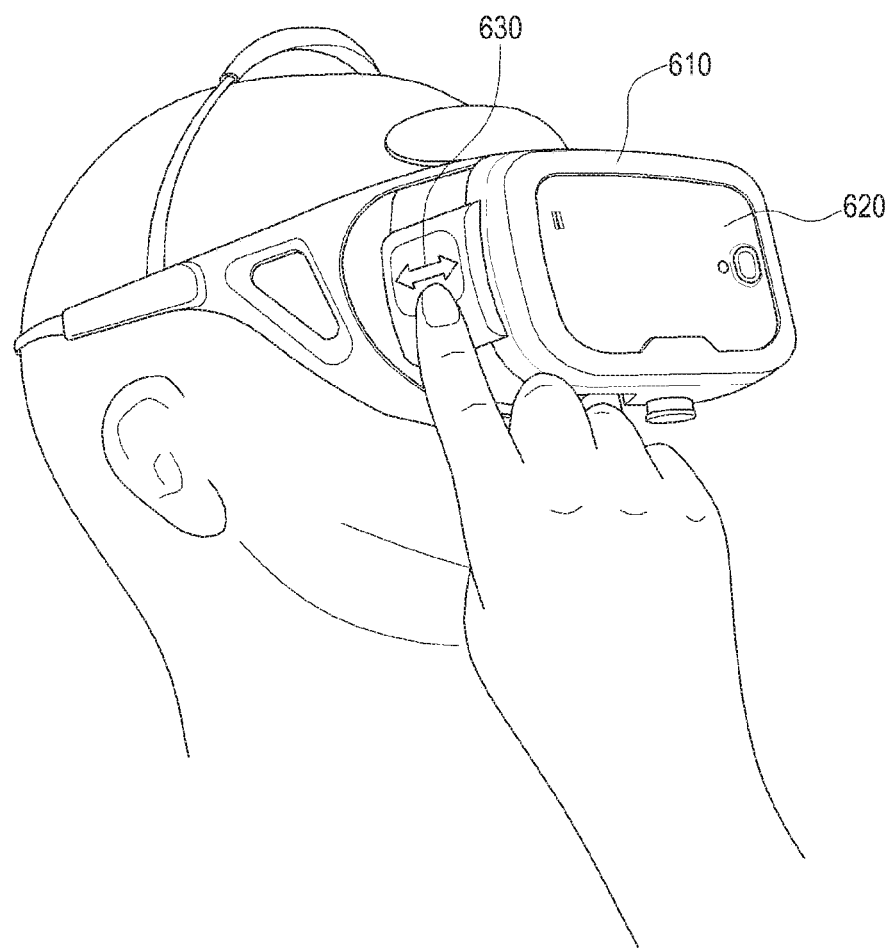
FIG. 6 illustrates an example in which a user wears a wearable device on which an electronic device is mounted according to an embodiment of the present disclosure.

FIG. 5 illustrates an example in which an electronic device is mounted on a wearable device according to an embodiment of the present disclosure, and FIG. 6 illustrates an example in which a user wears a wearable device on which an electronic device is mounted according to an embodiment of the present disclosure.

Referring to FIG. 5, a wearable device 510 is illustrated, where the wearable device 510 may be, for example, the electronic device 102 of FIG. 1. Further, as described above, the wearable device 510 may provide only a function of a simply holder which does not have a function of communicating with an electronic device 520. The wearable device 510 may include a main body and a cover.

When the electronic device 520 is mounted on the wearable device 510, the cover may cover a rear edge of the electronic device 520 to be fixed to the wearable device 510 in order to maintain a mounted state of the electronic device 520, as illustrated in FIG. 5. The wearable device 510 may include a support which can be used when the user puts the wearable device 510 on his/her head.

Further, a plurality of lenses may be located at positions in the wearable device 510 corresponding to both eyes of the wearer. The wearer may view a screen of a display (not shown) of the electronic device 520 through the lenses in a state where the electronic device 520 is mounted on the wearable device 510. The wearable device 510 may have a mechanical structure to/from which the electronic device 520 can be attached/detached, as illustrated in FIG. 5.

According to an embodiment of the present disclosure, the wearable device 510 may include one or more of the components of the electronic device 101 of FIG. 1. For example, the wearable device 510 may include at least one of a touch panel, a button, a wheel key, and a touch pad. The touch panel may receive a touch input by the user. The touch input may be a direct touch input on the touch panel or a hovering input approaching the touch panel. When the electronic device 520 is mounted on the wearable device 510, the wearable device 510 may be connected to communicate with the electronic device 520 through an interface such as a USB.

The electronic device 520 may control a function corresponding to an input in response to the input received from the wearable device 510. For example, the electronic device 520 may control a volume or a screen (for example, an image reproduction screen in the HMT mode) in response to the received input. For example, when the electronic device 520 is mounted on the wearable device 510, an external device connection unit 521 of the electronic device 520 may be electrically connected to a connection unit 511 of the wearable device 510, so as to communicate with the wearable device 510.

Referring to FIG. 6, an example in which a user wears a wearable device 610 equipped with an electronic device 620 is illustrated.

Further, referring to FIG. 6, the electronic device 620 may be the electronic device 101 of FIG. 1, for example, a smart phone including a display means. The wearable device 610 may be the electronic device 102 of FIG. 1, for example, a wearable holder serving as a mechanical holder.

As illustrated in FIG. 6, the user may mount the electronic device 620 on the wearable device 610 such that a display unit (for example, a touch screen) of the electronic device 620 faces a user's face. The user may cover the wearable device 610 to fix the electronic device 620 to the wearable device 610.

As illustrated in FIG. 6, the user may put the wearable device 610 equipped with the electronic device 620 on his/her head. The wearer may watch the screen of the display of the mounted electronic device 620 through lenses included in the wearable device 610.

Further, as illustrated in FIG. 6, the user may control a function of the wearable device 610 or a function of the electronic device 620 through a touch pad 630 arranged on a side surface of the wearable device 610.

Referring to FIGS. 5 and 6, the electronic devices 520 and 620 may be the electronic device 101 of FIG. 1, for example, a smart phone including a display means. Wearable devices 510 and 610 may be the second electronic device 102 of FIG. 1, for example, a wearable holder simply serving as only a mechanical holder.

Figure 7:
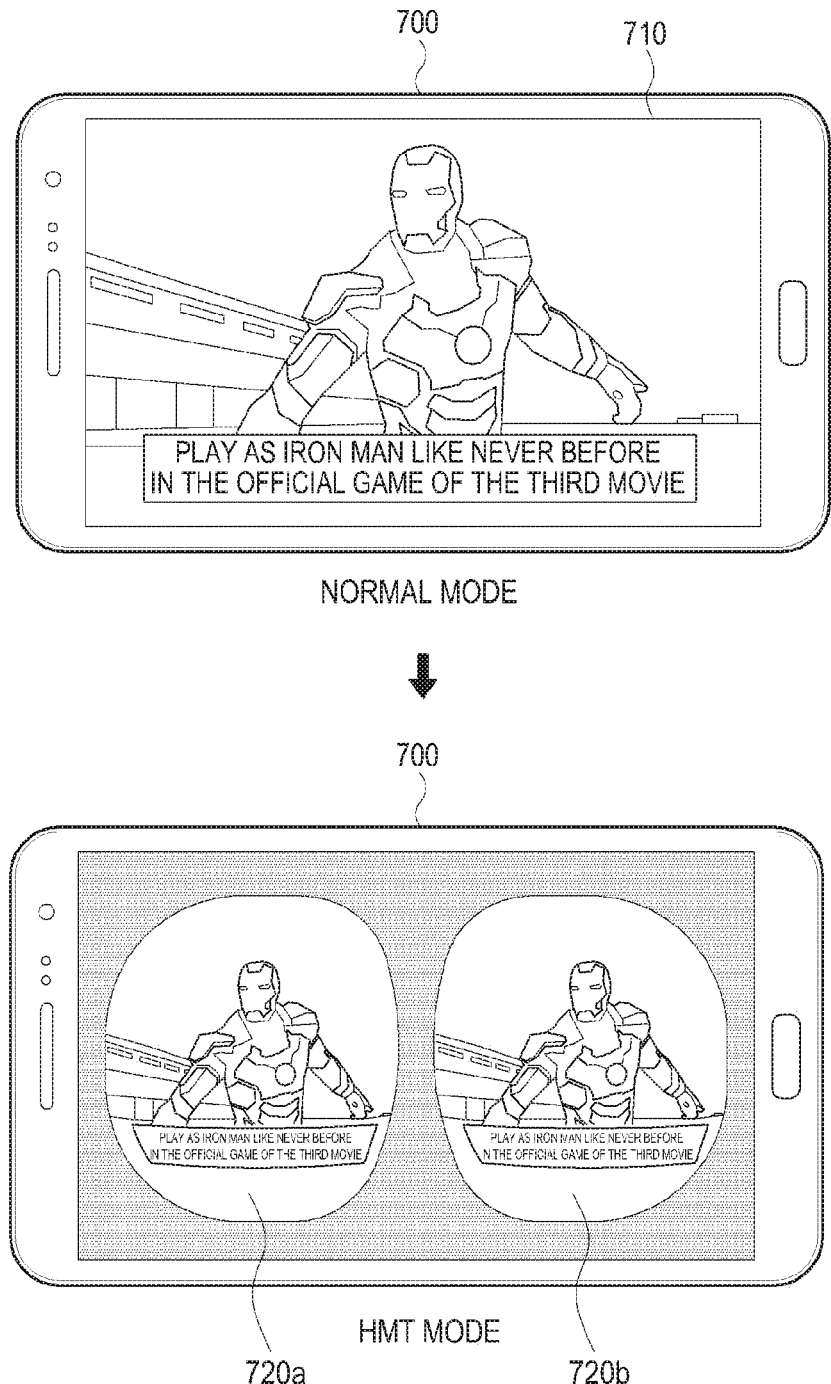
FIG. 7 illustrates a screen mode of an electronic device according to an embodiment of the present disclosure.

FIG. 7 illustrates a screen mode of an electronic device according to an embodiment of the present disclosure.

Referring to FIG. 7, an electronic device 700 is illustrated, where the electronic device 700 may be the electronic device 420, 520, or 620 of FIG. 4, 5, or 6. When the electronic device 700 operates in a normal mode (ex., monoscopic mode), one operation screen 710 may be displayed as illustrated in the upper side of FIG. 7.

According to an embodiment of the present disclosure, when the electronic device 700 is mounted on the wearable device, the electronic device 700 may operate in the HMT mode (ex., stereoscopic mode) as illustrated in the lower portion of FIG. 7. When the electronic device 700 operates in the HMT mode, divided screens which include a screen 720a corresponding to a user's left eye and a screen 720b corresponding to a user's right eye may be displayed. In the screen of the HMT mode, one image may be divided into and displayed as two images 720a and 720b. For example, when the user wears the wearable device equipped with the electronic device 700 and watches the screen according to the HMT mode, the user may feel as if the screen is a three dimensional (3D) screen.

According to an embodiment of the present disclosure, when the electronic device 700 is mounted on the wearable device and operates in the HMT mode, display positions of the screens (the screen 720a corresponding to the left eye and the screen 720b corresponding to the right eye) corresponding to the HMT mode may be determined.

Further, according to an embodiment of the present disclosure, when the electronic device 700 is mounted on the wearable device and operates in the HMT mode, various input/output functions may be provided using at least some of the remaining areas except for the screens displayed according to the HMT mode. For example, as described through FIG. 10, as discussed below, various functions may be provided using at least some (for example, the second screen area) of the remaining screen areas except for the screen area corresponding to the HMT mode.

Hereinafter, an embodiment of the present disclosure will be described with reference to FIGS. 8 and 9 in which, when the electronic device 700 is mounted on the wearable device and operates in the HMT mode, display positions of the screens (the screen 720a corresponding to the left eye and the screen 720b corresponding to the right eye) corresponding to the HMT mode are determined.

Figure 8:
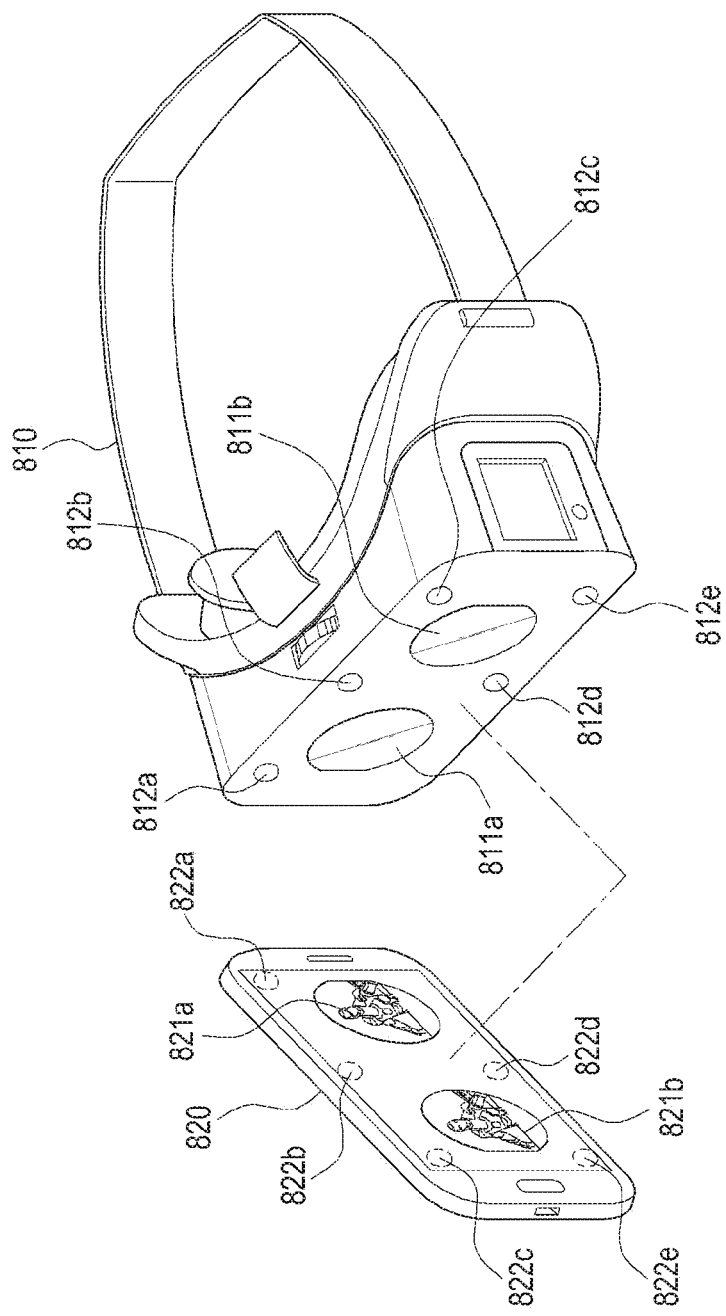
FIG. 8 illustrates a method of detecting a reference point in an electronic device according to an embodiment of the present disclosure.

FIG. 8 illustrates a method of detecting a reference point in an electronic device according to an embodiment of the present disclosure.

Referring to FIG. 8, an electronic device 820 is illustrated, such that when the electronic device 820 is mounted on a wearable device 810 and display screens 821a and 821b of the HMT mode are displayed as display screens of the electronic device 820, a reference point may be detected from the wearable device 810 and thus display positions of the screens 821a and 821b of the HMT mode may be determined according to an embodiment of the present disclosure.

According to an embodiment of the present disclosure, one or more conductive parts 812a, 812b, 812c, 812d, and 812e may be located on at least some of the front surface of the wearable device 810 (for example, a surface which makes contact with a screen of a display unit of the electronic device 820). The conductive parts 812 (e.g., conductive parts, 812a, 812b, 812c, 812d and 812e) may be implemented by metal materials having a relatively high capacitance, but embodiments of the present disclosure are not limited thereto. The conductive parts 812 may be formed of any material which can be recognized by the touch panel of the electronic device 820. For example, the conductive parts 812 may be formed of any material which can change capacitance of the touch panel by contact.

When the electronic device 820 is mounted on the wearable device 810 and thus the touch screen of the electronic device 820 approaches a front surface portion or makes contact with at least some of the front surface portion of the wearable device 810, the touch panel included in the touch screen of the electronic device 820 may detect the one or more conductive parts 812 included in the wearable device 810.

The electronic device 820 may determine positions where the screens 821a and 821b are displayed on a display (for example, the touch screen) from positions 822a, 822b, 822c, 822d, and 822e of the touch panel where the conductive parts 812 are detected. As described above, the display positions of the screens corresponding to the HMT mode may be configured as the first screen area, and at least some of the remaining areas except for the first screen area among the whole screen area may be configured as the second screen area.

The type, form, position, number, shape, and pattern of the materials of the conductive parts 821 may be variously implemented. FIG. 8 illustrates an example in which five conductive parts are arranged on the upper left side, the upper middle side, the upper right side, the lower middle side, and the lower right side of the front surface portion of the wearable device 810.

The user who wears the wearable device 810 equipped with the electronic device 820 may view the screens 821a and 821b displayed on the display of the electronic device 820 through lenses 811a and 811b of the wearable device 810. According to an embodiment of the present disclosure, by determining positions of the screens to be displayed according to the mounting of the electronic device 820 as describe above, screens suitable for positions of the user's eyes may be displayed regardless of the size, form, type, installation degree, or installation type of the electronic device 820.

Figure 9:
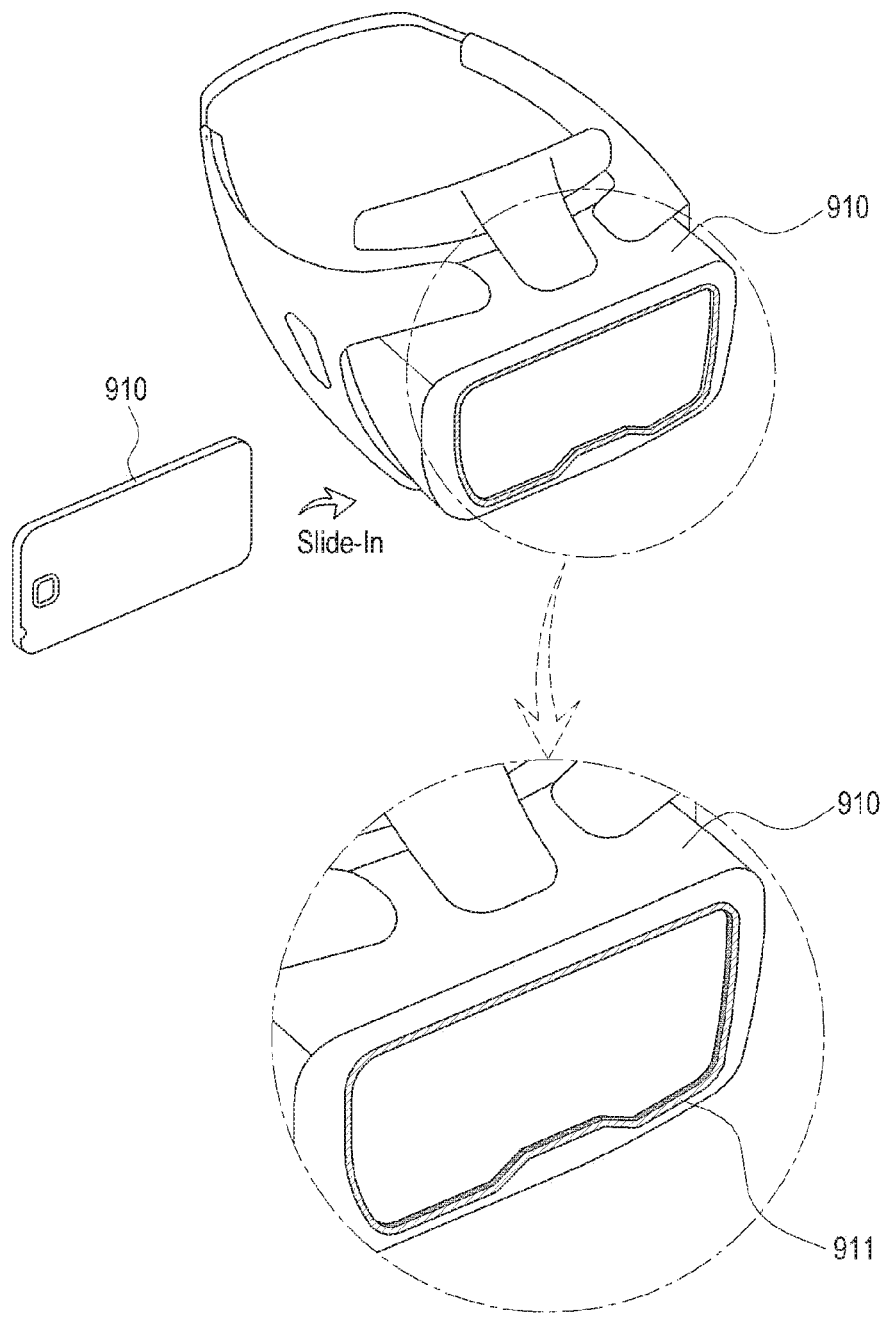
FIG. 9 illustrates conductive parts in a wearable device according to an embodiment of the present disclosure.

FIG. 9 illustrates conductive parts in a wearable device according to an embodiment of the present disclosure.

Referring to FIG. 9, a wearable device 910 and conductive parts 911 are illustrated, where the conductive parts 911 may be arranged in a circular form around a circumference of a lens unit located on the front surface of the wearable device 910. According to an embodiment of the present disclosure, in the positions of the lens unit, pupils may replace the lenses. For example, the conductive parts 911 may be arranged around the circumference of the pupils. Although the conductive part 911 is arranged around the whole circumference of the pupils in a circular form in FIG. 9, the conductive part 911 may be arranged only in some or particular positions.

Figure 10:
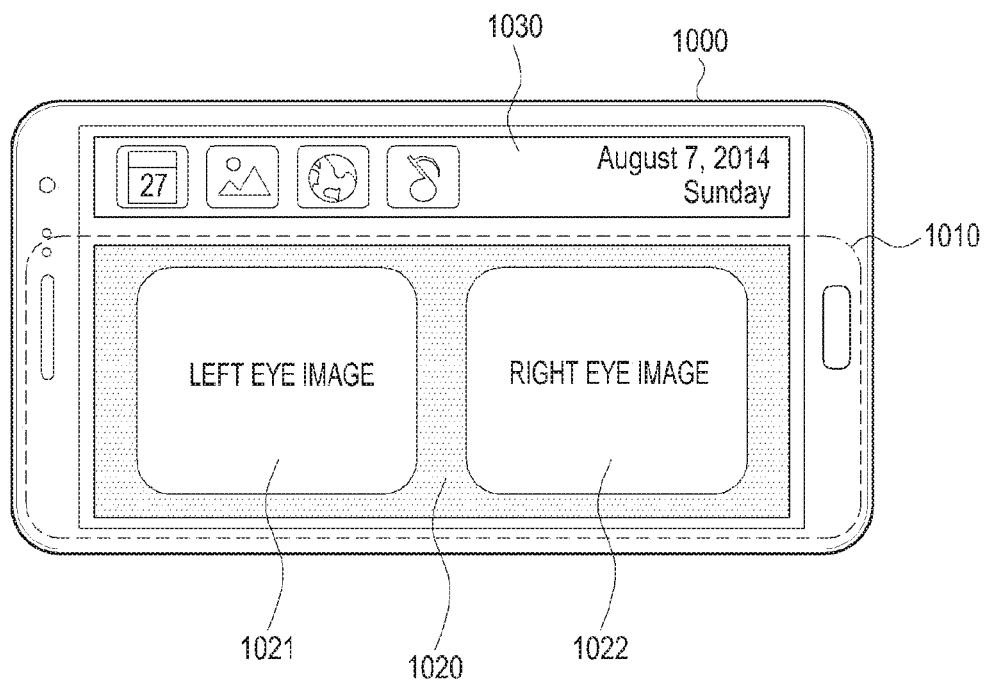
FIG. 10 illustrates a screen area according to an embodiment of the present disclosure.

FIG. 10 illustrates a screen area according to an embodiment of the present disclosure.

Referring to FIG. 10, an electronic device 1000 is illustrated, such that a reference point may be detected from a conductive part 1010 of a wearable device equipped with the electronic device 1000 and a screen area (for example, a first screen area 1020) corresponding to an HMT mode may be determined by the detected reference point.

Further, a left eye image area 1021 and a right eye image area 1022 may be determined within the first screen area 1020. According to an embodiment of the present disclosure, when the electronic device 1000 is mounted on the wearable device and an image according to the HMT mode is displayed in the screen area 1020 corresponding to the HMT mode, the user may view the screen in the HMT mode through a left lens and a right lens of the wearable device.

Further, according to an embodiment of the present disclosure, at least some of screen areas except for the first screen area 1020 among the whole screen areas may be determined as a second screen area 1030. According to an embodiment of the present disclosure, the second screen area 1030 may be used for performing various functions. For example, various pieces of information (for example, one or more icons for executing applications, weather information, information regarding the day of the week, schedule information, call reception information, text message reception information, information regarding various statuses, news information, and the like) which can be provided by the electronic device 1000 through the second screen area 1030.

Figure 11:
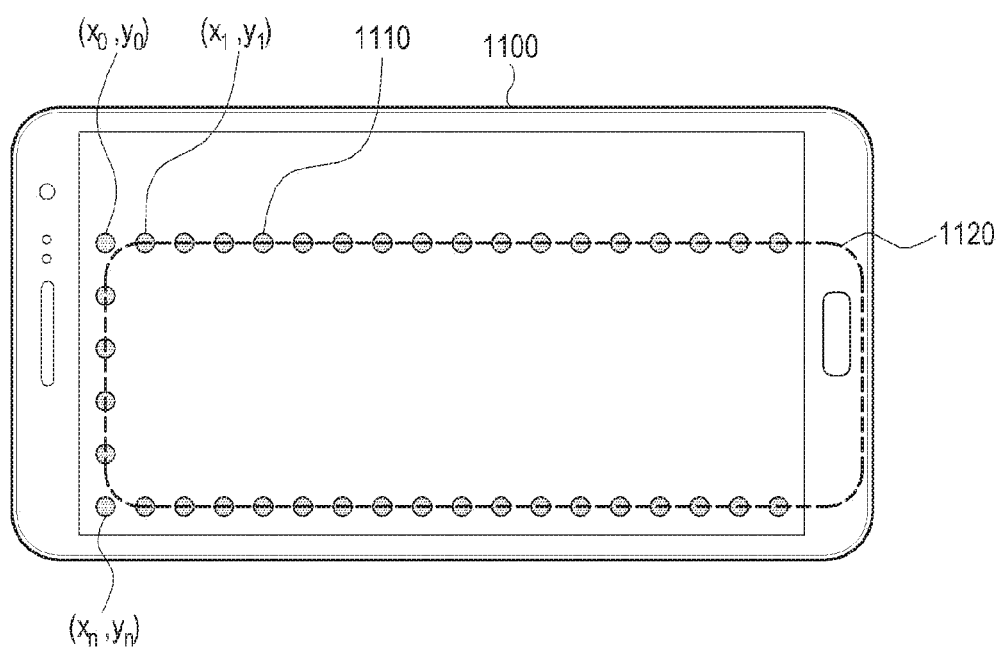
FIG. 11 illustrates a method of dividing a screen area according to an embodiment of the present disclosure.

FIG. 11 illustrates a method of dividing a screen area according to an embodiment of the present disclosure.

Referring to FIG. 11, an electronic device 1100 is illustrated, such that when a touch screen of the electronic device 1100 makes contact with a conductive part 1120 of a wearable device, the touch screen of the electronic device 1100 may detect one or more reference points 1110 from the conductive part 1120 of the wearable device. A screen area (for example, a first screen area) corresponding to the HMT mode may be configured using the one or more reference points.

According to an embodiment of the present disclosure, as illustrated in FIG. 11, each reference point detected from the touch screen may be displayed as a coordinate (x, y), and a first screen area and a second screen area may be determined from the coordinate of each reference point. According to an embodiment of the present disclosure, the first screen area may display a stereoscopic view and the second screen area may display a monoscopic view.

A more detailed description will be made with reference to FIG. 11. For example, when the electronic device 1100 (for example, a smart phone) is mounted on a frame of the wearable device, a capacitive material at least partially included in the frame opening circumference contacts a touch screen of the electronic device 1100, and a value such as a touch coordinate $(x_0, y_0), (x_1, y_1), \ldots, (x_n, y_n)$ may be input every contact point.

The touch coordinate may be used as a reference point for determining the first screen area, and the first screen area may be determined by Equation 1 and Equation 2 based on the reference point.

$$(X_L, Y_T) = (\min\{x_0, x_1, \ldots, x_n\}, \max\{y_0, y_1, \ldots, y_n\})\quad \text{Equation 1; and}$$

$$(X_R, Y_B) = (\max\{x_0, x_1, \ldots, x_n\}, \min\{y_0, y_1, \ldots, y_n\})\quad \text{Equation 2.}$$

For example, an upper left contact point $(X_L, Y_T)$ and a lower right contact point $(X_R, Y_B)$ may be found based on Equation 1 and Equation 2. The inside of an area formed based on the corresponding contact point may be configured as a first screen area and the first screen area may be displayed as a stereoscopic view. The outside of the area may be configured as a second screen area and the second screen area may be displayed as a monoscopic view.

The area determination method is applied to a case where the shape of the opening circumference of a frame formed in the wearable device, and other area determination methods may be also applied according to various shapes of the opening circumference such as a circle, oval, diamond and the like.

Figure 12:
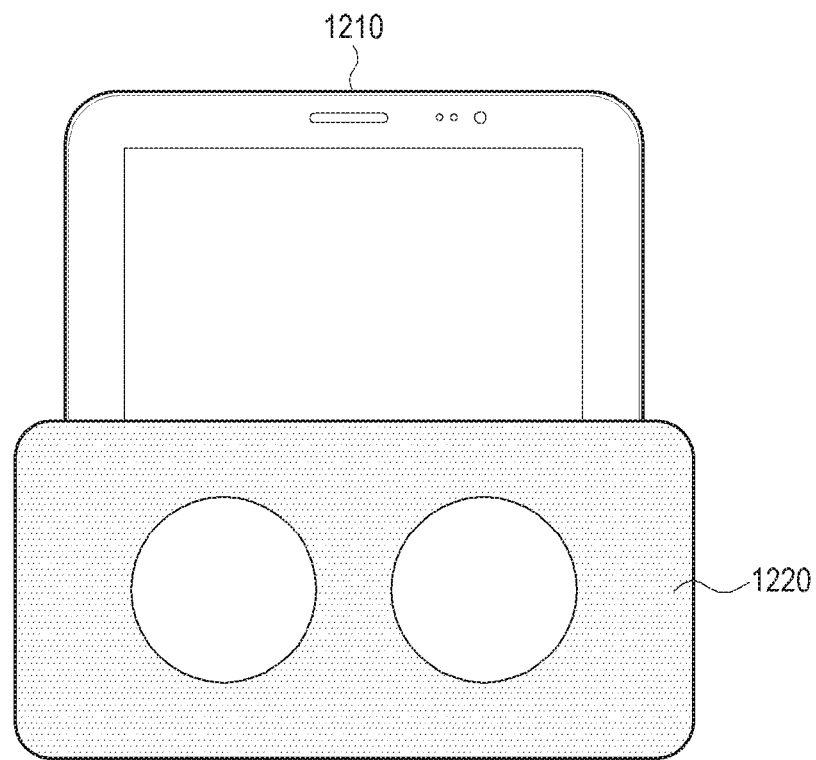
FIG. 12 illustrates an example of mounting of an electronic device having various sizes of displays according to an embodiment of the present disclosure.
Figure 13:
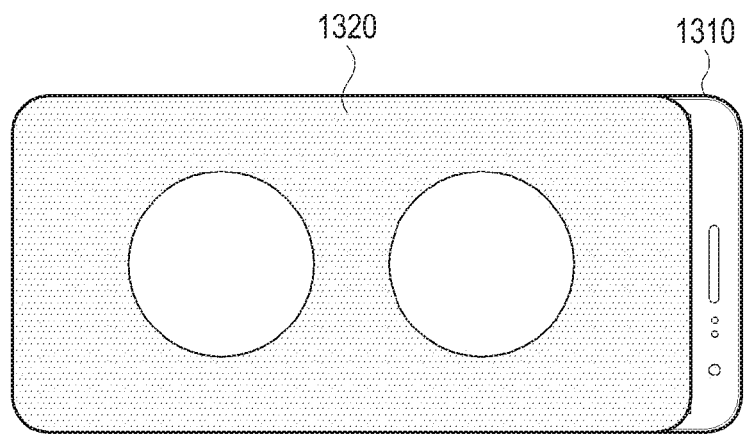
FIG. 13 illustrates an example of mounting of an electronic device having various sizes of displays according to an embodiment of the present disclosure.

FIGS. 12 and 13 illustrate examples of mounting electronic devices having various sizes of displays according to an embodiment of the present disclosure.

Referring to FIGS. 12 and 13, electronic devices 1210 and 1310 (for example, smart phones, tablets or the like) are illustrated, where the electronic devices 1210 and 1310 include various sizes or shapes of displays and may be mounted on a frame of a wearable device.

For example, as illustrated in FIG. 12, a 9 inch electronic device (e.g., tablet) 1210 may be vertically mounted to a wearable device 1220. Further, as illustrated in FIG. 13, a 5 inch electronic device (e.g., tablet) 1310 may be horizontally mounted to a wearable device 1320. According to an embodiment of the present disclosure, although the electronic devices 1210 and 1310 including various sizes or shapes of displays are mounted on the wearable device as illustrated in FIGS. 12 and 13, an entire screen of the electronic devices 1210 and 1310 may be divided into a first screen area and a second screen area and the respective screen areas may provide various functions.

Hereinafter, FIGS. 14 to 30 illustrate examples of dividing a screen into a first screen area and a second screen and providing various functions through the divided screen areas according to an embodiment of the present disclosure.

Figure 14:
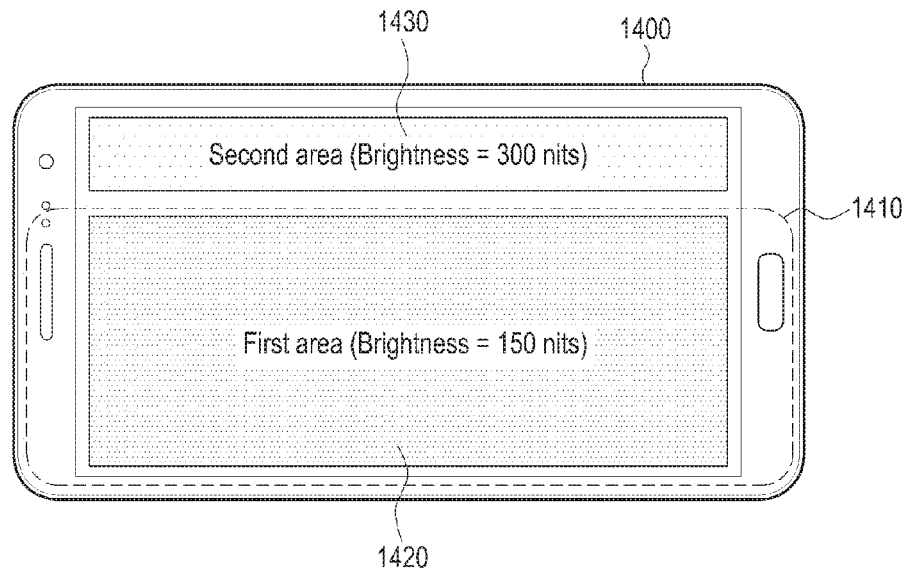
FIG. 14 illustrates a screen configuration of divided areas according to an embodiment of the present disclosure.

FIG. 14 illustrates a screen configuration of divided areas according to an embodiment of the present disclosure.

Referring to FIG. 14, an electronic device 1400 is illustrated, such that when a touch screen of the electronic device 1400 makes contact with a conductive part 1410 of a wearable device, an entire screen area may be divided into a first screen area 1420 and a second screen area 1430 as described above.

According to an embodiment of the present disclosure, different brightness values may be applied to the first screen area 1420 and the second screen area 1430. Since the first screen area 1420 may be displayed in a see-closed dark environment as a virtual reality area, the first screen area 1420 may secure visibility even though a brightness value thereof is configured to be relatively smaller than a brightness value of the second screen area 1430 corresponding to a normal area. For example, the brightness value of 150 nits may be applied to the first screen area 1420 and the brightness value of 300 nits may be applied to the second screen area 1430.

Figure 15:
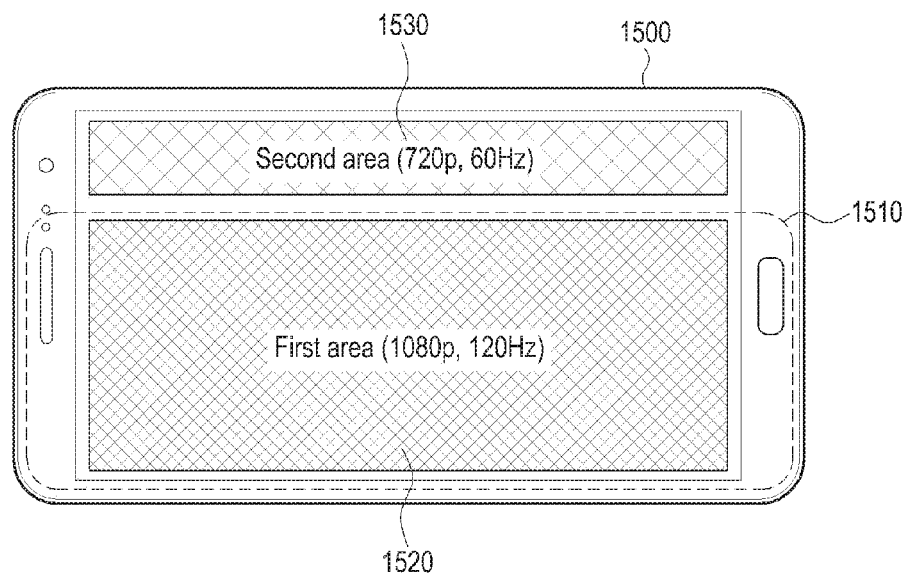
FIG. 15 illustrates a screen configuration of divided areas according to an embodiment of the present disclosure.

FIG. 15 illustrates a screen configuration of divided areas according to an embodiment of the present disclosure.

Referring to FIG. 15, an electronic device 1500 is illustrated, such that when a touch screen of the electronic device 1500 makes contact with a conductive part 1510 of a wearable device, an entire screen area may be divided into a first screen area 1520 and a second screen area 1530 as described above.

According to an embodiment of the present disclosure, different resolutions and/or refresh rates may be applied to the first screen area 1520 and the second screen area 1530. Since the first screen area 1520 is a virtual reality area and may display a stereoscopic image, provided contents may be reduced and displayed. Further, since a screen displayed through the first screen area 1520 is expanded through a lens located at the frame of the wearable device, a resolution of the first screen area 1520 may be configured to be relatively larger than a resolution of the second screen area 1530 corresponding to a normal area according to an embodiment of the present disclosure. For example, a resolution of 1080p may be applied to the first screen area 1520 and a resolution of 720p may be applied to the second screen area 1530.

Further, according to an embodiment of the present disclosure, the first screen area 1520 may provide a virtual space image such as a 3D image and change an image according to user's head tracking, so that a motion blur phenomenon generated by an afterimage left in optic nerve when a current frame image is turned to a next frame image may occur. In order to remove the motion blur phenomenon, the refresh rate of the first screen area 1520 may be configured to be relatively larger than the refresh rate of the second screen area 1530. For example, the refresh rate of 120 Hz may be applied to the first screen area 1520 and the refresh rate of 60 Hz may be applied to the second screen area 1530.

Figure 16:
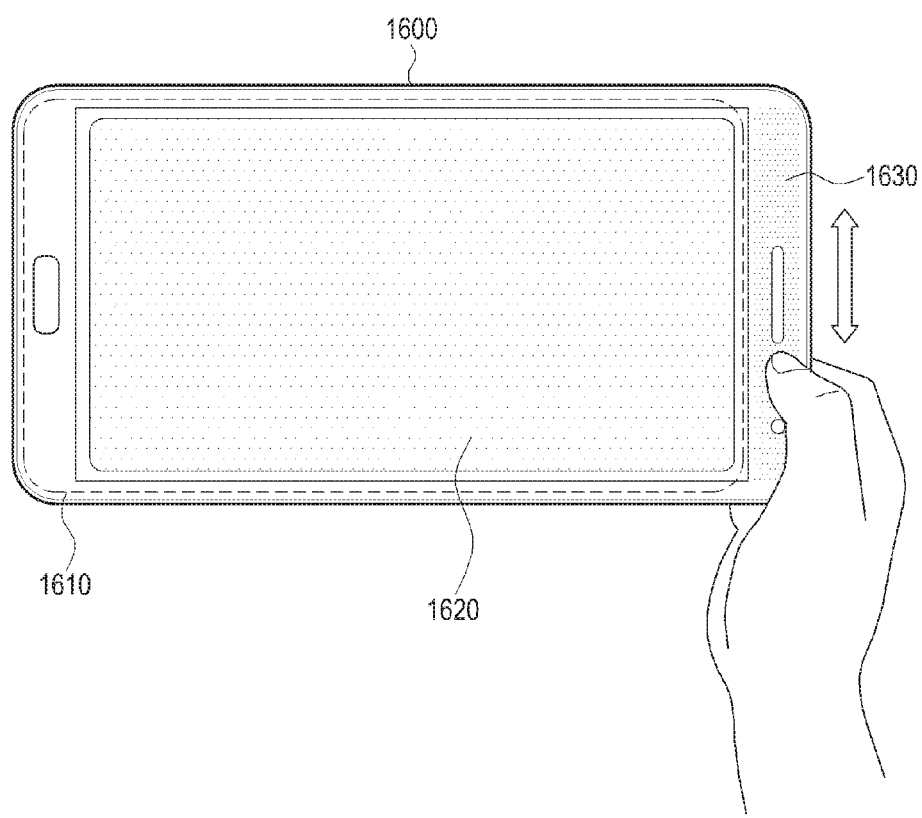
FIG. 16 illustrates an input using a sub touch pad according to an embodiment of the present disclosure.

FIG. 16 illustrates an input using a sub touch pad according to an embodiment of the present disclosure.

Referring to FIG. 16, an electronic device 1600 is illustrated, such that a sub touch pad may be located in a bezel area 1630 of the electronic device 1600. For example, when a touch screen of the electronic device 1600 makes contact with a conductive part 1610 of a wearable device, various functions may be provided through a screen area 1620 (for example, a first screen area and/or a second screen area) as described above, and an HMT function may be controlled using the sub touch pad located in the bezel area 1630.

For example, the function of the sub touch pad may be inactivated when the electronic device is in a general smart phone state. When the electronic device operates in the HMT mode, the function of the sub touch pad is activated and various functions related to the HMT mode may be provided. For example, when the electronic device operates in the HMT mode, if the user makes a touch input (for example, dragging or sliding) through the sub touch pad, the screen area 1620 of the HMT mode may be scrolled.

Figure 17:
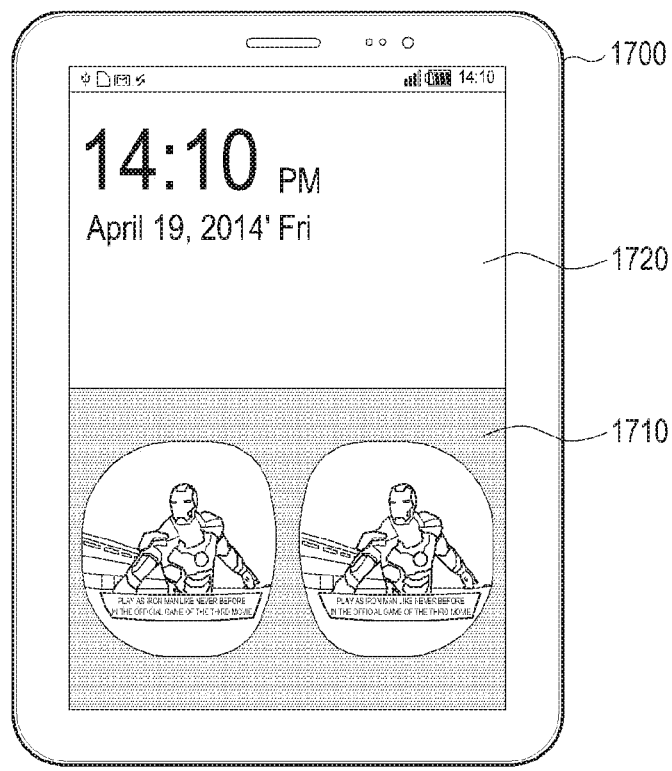
FIG. 17 illustrates a screen displayed when an electronic device is vertically mounted according to an embodiment of the present disclosure.

FIG. 17 illustrates a screen displayed when an electronic device is vertically mounted according to an embodiment of the present disclosure.

Referring to FIG. 17, an electronic device 1700 is illustrated, such that when the electronic device 1700 is vertically mounted on a wearable device, a first screen area 1710 corresponding to an HMT screen mode may be configured to a lower side of an entire screen and a second screen area 1720 corresponding to a normal screen mode may be configured to an upper side of the entire screen.

The first screen area 1710 may include a left eye image screen area and a right image screen area to display a stereoscopic screen as illustrated in FIG. 17. The second screen area 1720 may display one screen which is a normal screen and not the stereoscopic screen as illustrated in FIG. 17.

The user may view an HMT screen of a stereoscopic image through the first screen area 1710 in a state where the user wears the wearable device on which the electronic device 1700 is mounted. Further, the electronic device 1700 may provide various functions through the second screen area 1720. According to an embodiment of the present disclosure, when the second screen area 1720 protrudes outside the wearable device, functions basically provided by the electronic device 1700 may be provided through the second screen area 1720.

Figure 18:
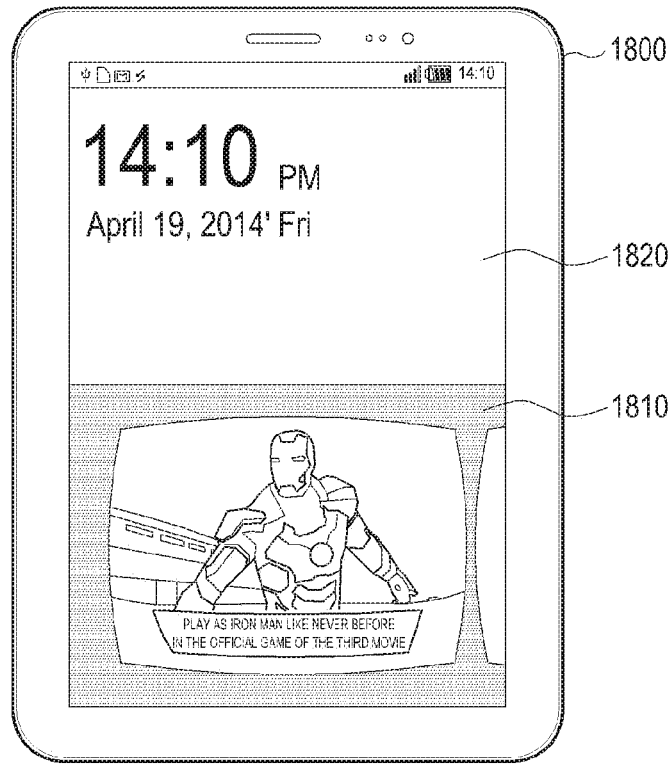
FIG. 18 illustrates a screen displayed when an electronic device is vertically mounted according to an embodiment of the present disclosure.

FIG. 18 illustrates a screen displayed when an electronic device is vertically mounted according to an embodiment of the present disclosure.

Referring to FIG. 18, an electronic device 1800 is illustrated, such that when the electronic device 1800 is vertically mounted on a wearable device, a first screen area 1810 corresponding to an HMT screen mode may be configured to a lower side of an entire screen and a second screen area 1820 corresponding to a normal screen mode may be configured to an upper side of the entire screen. When the first screen area 1810 displays a normal screen which is not the stereoscopic screen, one screen area may be displayed as illustrated in FIG. 18.

Further, the electronic device 1800 may provide various functions through the second screen area 1820. According to an embodiment of the present disclosure, when the second screen area 1820 protrudes outside the wearable device, functions basically provided by the electronic device 1800 may be provided through the second screen area 1820.

Figure 19:
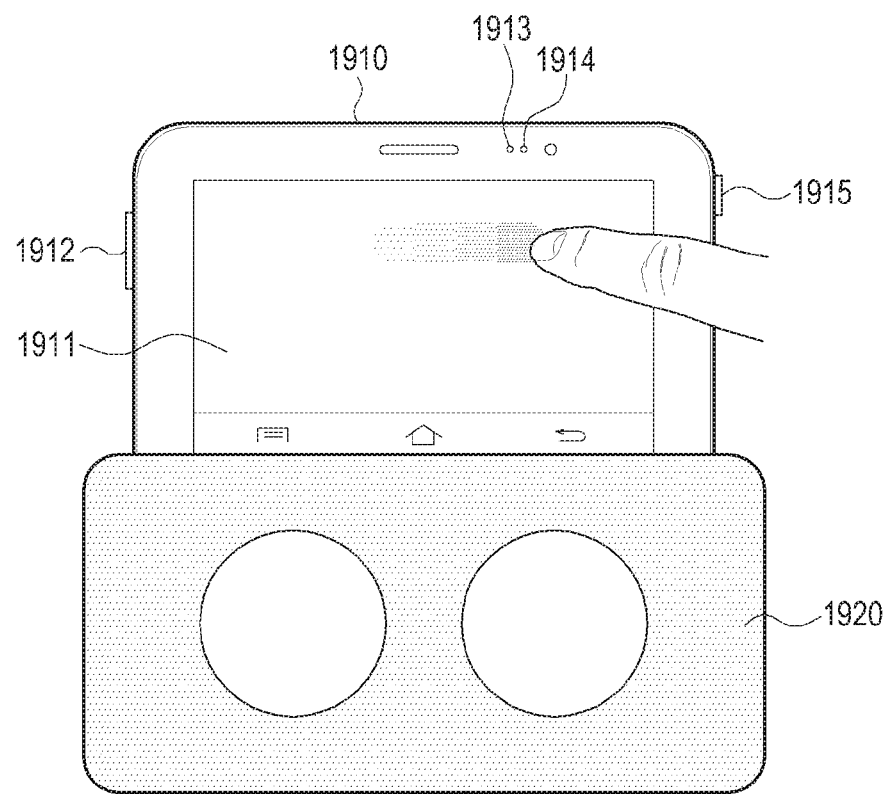
FIG. 19 illustrates a touch in a second screen area according to an embodiment of the present disclosure.

FIG. 19 illustrates a touch in a second screen area according to an embodiment of the present disclosure.

Referring to FIG. 19, an electronic device 1910 is illustrated, such that when the electronic device 1910 is vertically mounted on a wearable device 1920, a second screen area 1911 among an entire screen may protrude outside the wearable device 1920.

When the user directly touches the second screen area 1911 or makes a preset gesture, various predetermined functions may be performed. Further, the electronic device 1910 or the first screen area may be controlled using various functions included in the electronic device 1910.

For example, the electronic device 1910 may include a volume key 1912, a gesture key 1913, an illumination sensor 1914, and a power key 1915. The user may control a volume of an image displayed in the first screen area by using the volume key 1912. Further, the electronic device 1910 may perform a preset function by recognizing a user's gesture through the gesture sensor 1913 or sensing illumination through the illumination sensor 1914.

In addition, the user may stop or pause the image displayed in the first screen area by pressing the power key 1915.

Although not illustrated in FIG. 19, various functions, which can be provided by the electronic device 1910, may be provided in the HMT mode according to an embodiment of the present disclosure.

Figure 20:
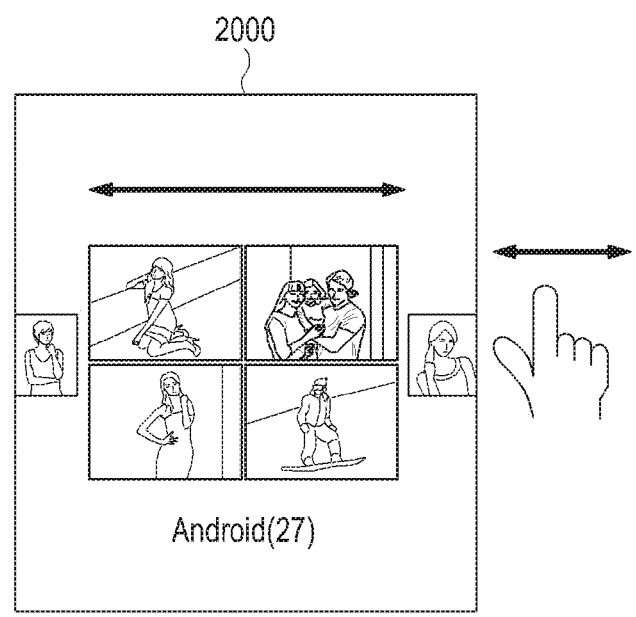
FIG. 20 illustrates a method of controlling a screen area by a gesture according to an embodiment of the present disclosure.

FIG. 20 illustrates a method of controlling a screen area by a gesture according to an embodiment of the present disclosure.

Referring to FIG. 20, an first screen area 2000 is illustrated, such that when an electronic device is mounted on a wearable device and a screen is displayed in the first screen area 2000, a user may perform various predetermined functions by making a preset gesture on the outside of the electronic device.

For example, when the user makes a gesture of moving a finger from side to side, images displayed in the first screen area 2000 may be moved from side to side or various displayed menus may be scrolled in response to the gesture.

Figure 21:
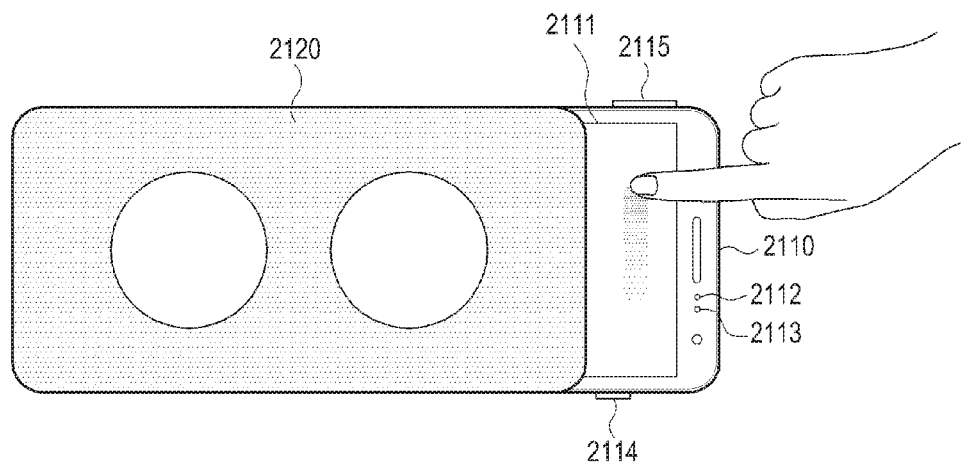
FIG. 21 illustrates a method of controlling a screen when an electronic device is horizontally mounted according to an embodiment of the present disclosure.

FIG. 21 illustrates a method of controlling a screen when an electronic device is horizontally mounted according to an embodiment of the present disclosure.

Referring to FIG. 21, an electronic device 2110 is illustrated, such that when the electronic device 2110 is vertically mounted on a wearable device 2120, a second screen area 2111 among the entire screen may protrude outside the wearable device 2120.

When the user directly touches the second screen area 2111 or makes a preset gesture, various predetermined functions may be performed. Further, the electronic device 2110 or the first screen area may be controlled using various functions included in the electronic device 2110.

For example, the electronic device 2110 may include a volume key 2115, a gesture key 2112, an illumination sensor 2113, and a power key 2114. The user may control a volume of an image displayed in the first screen area by using the volume key 2115. Further, the electronic device 2110 may perform a preset function by recognizing a user's gesture through the gesture sensor 2112 or sensing illumination through the illumination sensor 2113.

In addition, the user may stop or pause the image displayed in the first screen area by pressing the power key 2114.

Although not illustrated in FIG. 21, various functions which can be provided by the electronic device 2110 may be provided in the HMT mode according to an embodiment of the present disclosure.

Figure 22:
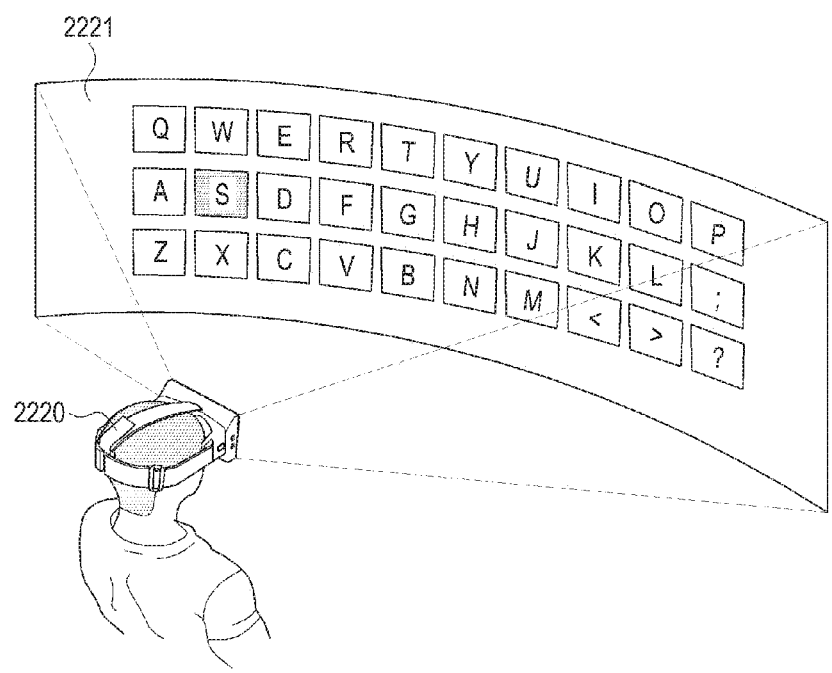
FIG. 22 illustrates an example of a character input in an head mounted theater (HMT) mode according to an embodiment of the present disclosure.
Figure 23:
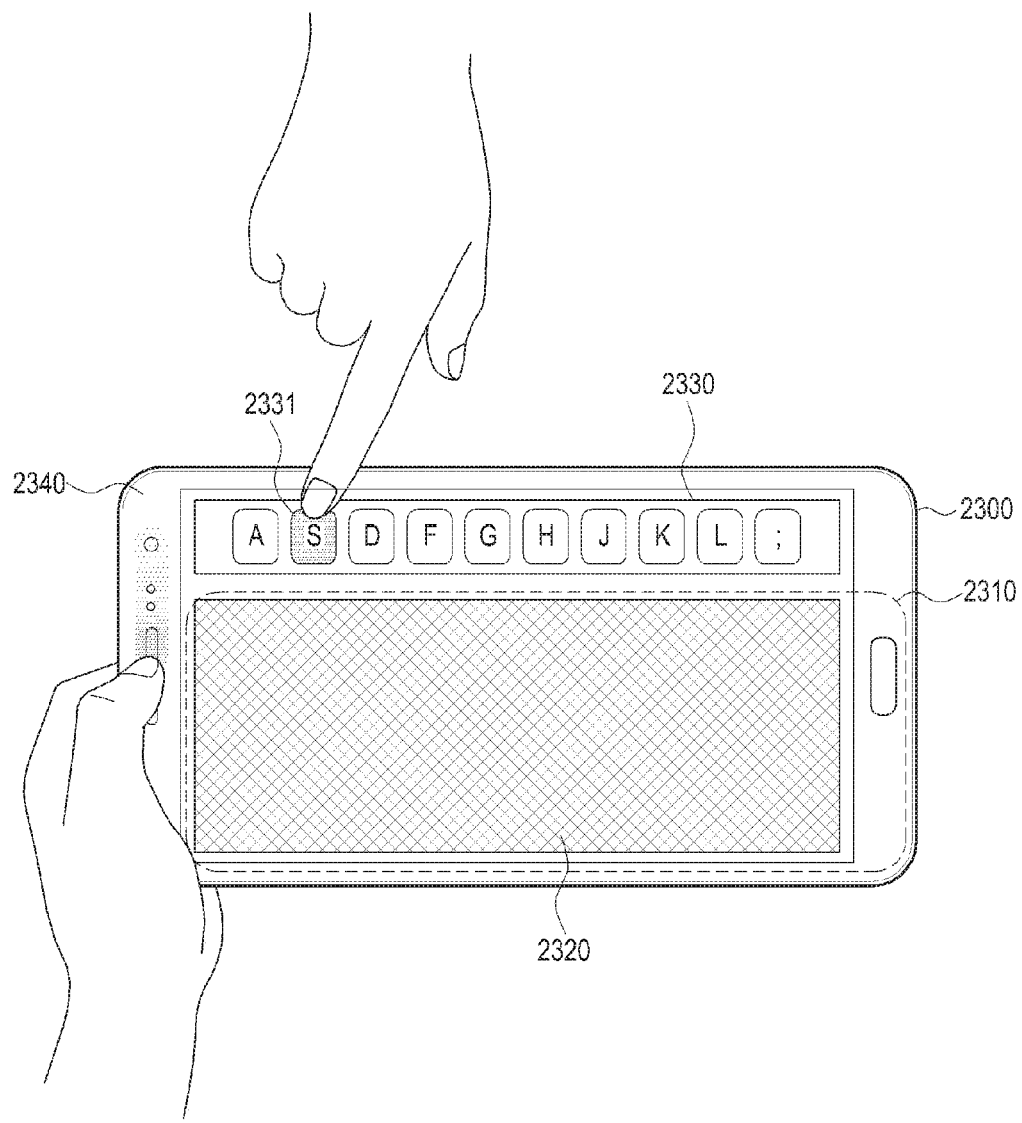
FIG. 23 illustrates an example of a character input in an HMT mode according to an embodiment of the present disclosure.

FIG. 22 illustrates an example of a character input in a HMT mode according to an embodiment of the present disclosure, and FIG. 23 illustrates an example of a character input in an HMT mode according to an embodiment of the present disclosure.

Referring to FIG. 22, when a user wears a wearable device 2220 on which an electronic device is mounted, a virtual keypad 2221 for various character inputs may be provided through a first screen area.

Referring to FIG. 23, an electronic device 2300 vertically mounted to a wearable device 2310 is illustrated, such that a virtual keypad or a screen corresponding to an HMT mode may be provided through a first screen area 2320 of the electronic device 2300. The first screen area 2320 may be implemented such that a touch function is inactivated.

The user may input characters in the virtual keypad by making a preset gesture outside of the electronic device 2300.

For example, as illustrated in FIG. 23, the virtual keypad may be displayed in a second screen area 2330 in the unit of lines.

For example, when the user scrolls a bezel area 2340 located at one side of the electronic device 2300 in order to press an "S" key 2331 displayed in the first screen area 2320, one line may be selected from the virtual keypad displayed in the first screen area 2320 and the selected line may be displayed in the second screen area 2330 as illustrated in FIG. 23. For example, as illustrated in FIG. 23, a second keypad line (A, S, D, F, G, H, J, K, L, and ;) may be selected and displayed in the second screen area 2330. When the user touches an "S" position 2331 in the second screen area 2330, it may be processed as the input or selection of a character "S" from the first screen area 2330.

Figure 24:
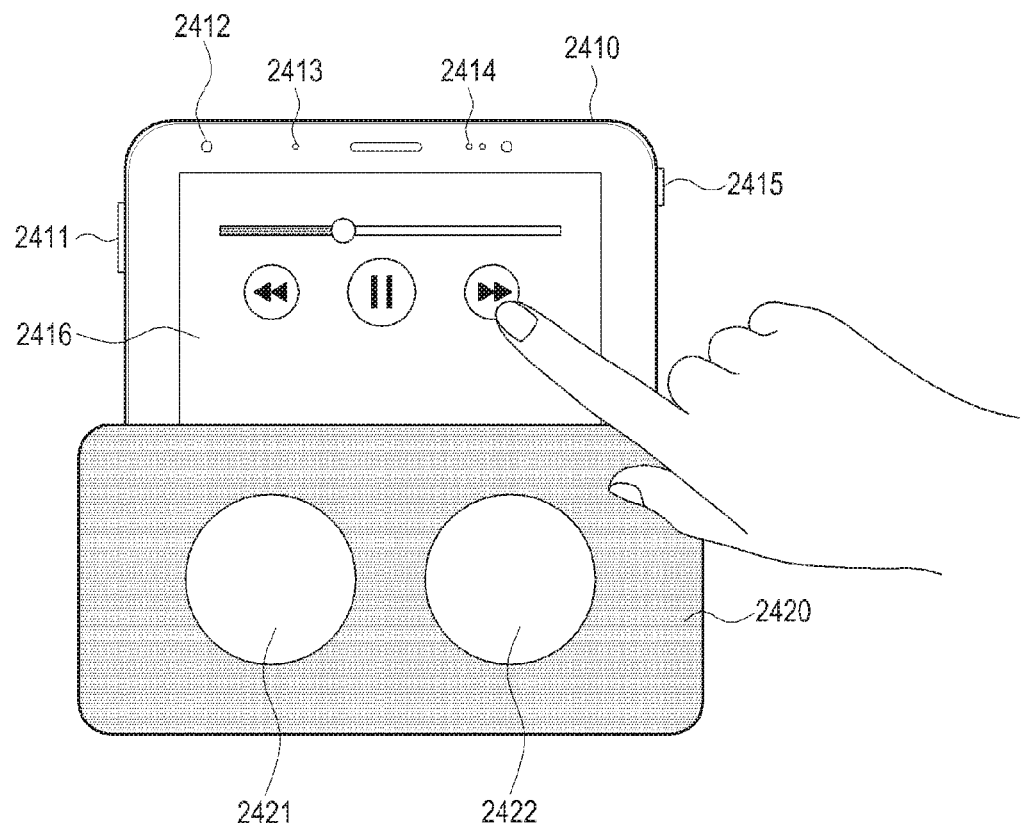
FIG. 24 illustrates a method of controlling a screen in a second screen area according to an embodiment of the present disclosure.

FIG. 24 illustrates a method of controlling a screen in a second screen area according to an embodiment of the present disclosure.

Referring to FIG. 24, an electronic device 2410 is illustrated, such that when the electronic device 2410 is vertically mounted on a wearable device 2420, a second screen area 2416 among an entire screen may protrude outside the wearable device 2420. The user may view a screen corresponding to the HMT mode displayed in a first screen area through lenses 2421 and 2422 included in the wearable device 2420 in a state where the user wears the wearable device 2420.

According to an embodiment of the present disclosure, the user may perform various predetermined functions by directly touching the second screen area 2416 or making a preset gesture. Further, the electronic device 2410 or the first screen area may be controlled using various functions included in the electronic device 2410.

For example, in the second screen area 2416, various buttons which can control an image reproduced in the first screen area may be provided. For example, buttons for stopping, pausing, fast forwarding, and rewinding an image, and a time line bar may be displayed. The user may perform predetermined functions by touching the second screen area 2416.

Further, according to an embodiment of the present disclosure, the electronic device 2410 may include a volume key 2411, an indicator 2412 (for example, an LED indicator), an ambient sensor 2413, a proximity sensor or gesture sensor 2414, and a power key 2415. Various input means or display means may provide functions related to the HMT mode provided in the first screen area or general functions of the electronic device 2140.

For example, the user may control a volume of an image displayed in the first screen area by using the volume key 2411. Further, the electronic device 2410 may perform a predetermined function by recognizing a user's gesture through the proximity sensor or gesture sensor 2414. For example, the electronic device may recognize the user's gesture through the gesture sensor 2414 and provide a function related to a screen displayed in the first screen area in response to the recognized gesture.

Further, according to an embodiment of the present disclosure, the electronic device may perform a predetermined function by sensing ambient brightness through the ambient sensor 2413. In addition, the user may stop or pause the image displayed in the first screen area by pressing the power key 2415. Furthermore, the indicator 2412 may provide a function for informing the outside of information regarding various statuses related to the first screen area or the HMD mode.

Figure 25:
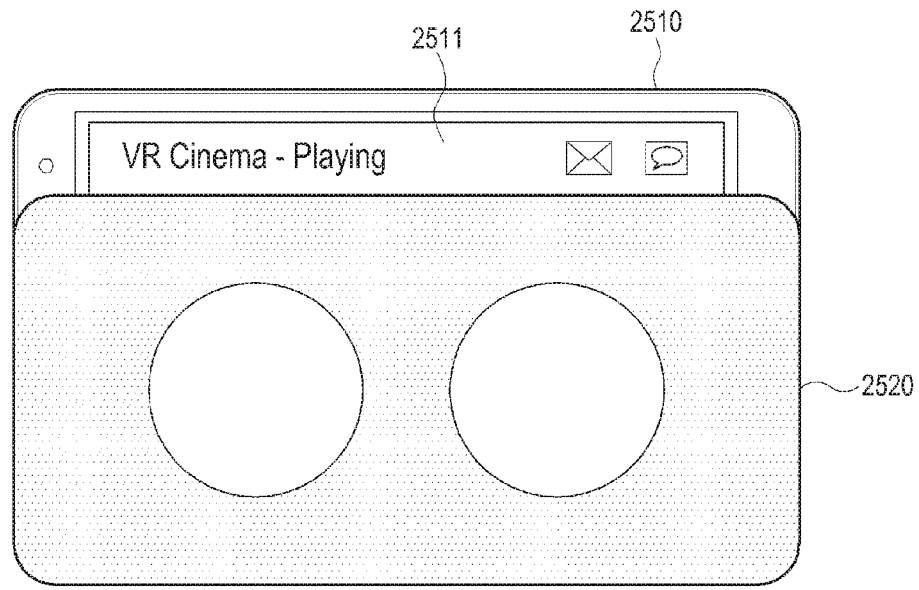
FIG. 25 illustrates an example of displaying information in a second screen area according to an embodiment of the present disclosure.

FIG. 25 illustrates an example of displaying information in a second screen area according to an embodiment of the present disclosure.

Referring to FIG. 25, an electronic device 2510 is illustrated, such that when the electronic device 2510 is horizontally or vertically mounted on a wearable device 2520, at least some of a second screen area 2511 of an entire screen may protrude outside the wearable device 2520.

According to an embodiment of the present disclosure, various pieces of information (for example, call reception information, text message reception information, information regarding various statuses, weather information, news information, and the like) which can be displayed on the screen of the electronic device 2510 may be displayed in the second screen area 2511.

Further, as illustrated in FIG. 25, information related to contents which is being reproduced in the current first screen area may be displayed or notification information such as message reception or notification may be displayed. When there is notification information which a wearer of the wearable device 2520 in a see-closed environment cannot recognize, an external third party who does not wear the wearable device 2520 may recognize the notification information through the second screen area 2511 and inform the wearer of the wearable device 2520 of the notification information.

Figure 26:
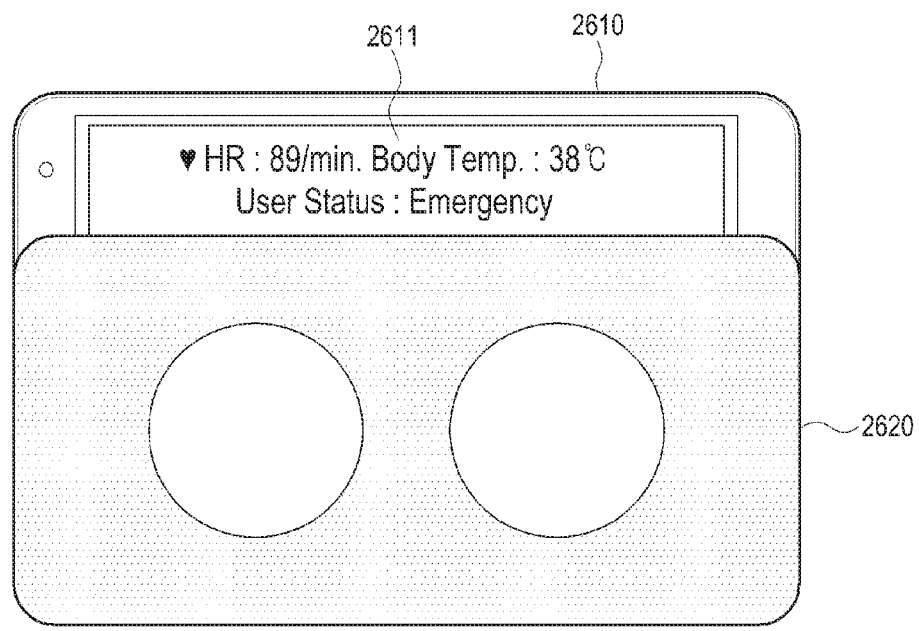
FIG. 26 illustrates an example of displaying information in a second screen area according to an embodiment of the present disclosure.

FIG. 26 illustrates an example of displaying information in a second screen area according to an embodiment of the present disclosure.

Referring to FIG. 26, an electronic device 2610 is illustrated, such that when the electronic device 2610 is horizontally or vertically mounted on a wearable device 2620, a second screen area 2611 of the entire screen may protrude outside the wearable device 2620.

According to an embodiment of the present disclosure, various pieces of information (for example, call reception information, text message reception information, information regarding various statuses, weather information, news information, and the like) which can be displayed on the screen of the electronic device 2611 may be displayed in the second screen area 2610.

For example, the electronic device 2610 may interwork with a second electronic device (for example, a smart watch) which is paired with the electronic device 2610 through a wire or wirelessly, and may display, in the second screen area 2611, various pieces of information provided from the second electronic device interworking with the electronic device 2610 as illustrated in FIG. 26.

The second electronic device may include one or more biometric sensors (for example, a temperature sensor, a Heart Rate Monitor (HRM) sensor and the like), and may measure biometric information (for example, a body temperature, a heart rate and the like) and transmit the measured information to the electronic device 2610. According to an embodiment of the present disclosure, when the user wears the wearable device 2620 on which the electronic device 2610 is mounted, information (for example, biometric information of the user) received from the second electronic device may be displayed in the second screen area 2611 of the electronic device 2610. An external third party may monitor status information of the wearer of the wearable device 2620 by identifying information displayed in the second screen area 2611 of the electronic device 2610.

Figure 27:
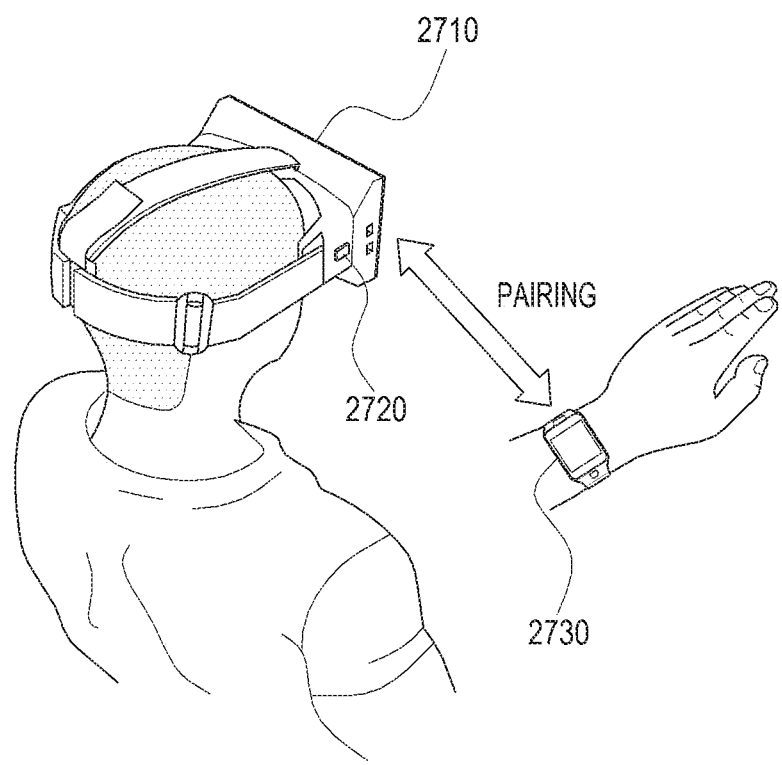
FIG. 27 illustrates interworking with an external device according to an embodiment of the present disclosure.

FIG. 27 illustrates interworking with an external device according to an embodiment of the present disclosure.

Referring to FIG. 27, a wearable device 2720 and an electronic device 2710 are illustrated, such that a user may wear the wearable device 2720 on which the electronic device 2710 is mounted and provide a function linked with a second electronic device (for example, a smart watch) 2730 which is paired with the electronic device 2710 through a wire or wirelessly.

According to an embodiment of the present disclosure, when the user wears the wearable device 2720 on which the electronic device 2710 is mounted, information (for example, biometric information of the user) received from the second electronic device (for example, the smart watch) 2730 may be displayed in the second screen area of the electronic device 2710.

Figure 28A:
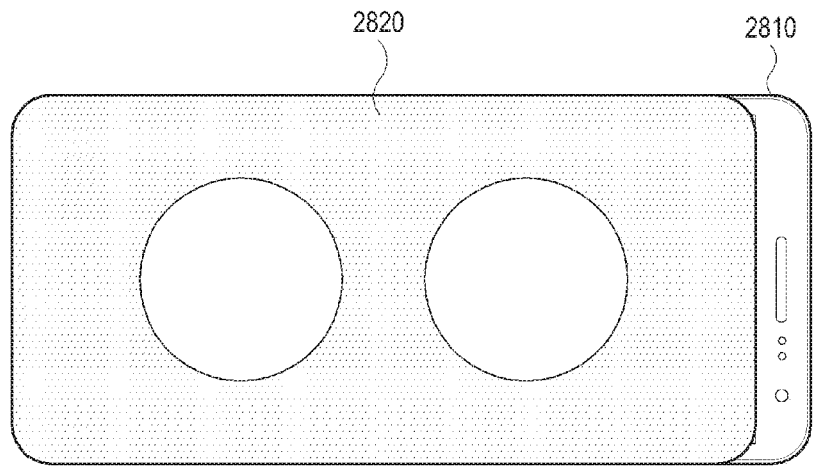
FIG. 28A illustrates an example in which an electronic device is horizontally mounted according to an embodiment of the present disclosure.
Figure 28B:
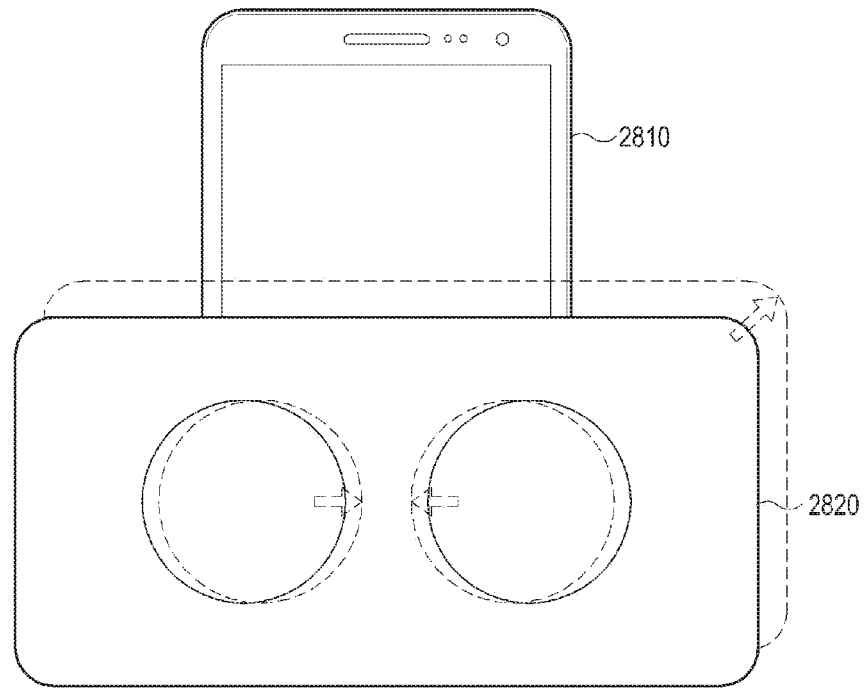
FIG. 28B illustrates an example in which an electronic device is vertically mounted according to an embodiment of the present disclosure.

FIG. 28A illustrates an example in which an electronic device is horizontally mounted according to an embodiment of the present disclosure and FIG. 28B illustrates an example in which an electronic device is vertically mounted according to an embodiment of the present disclosure.

Referring to FIG. 28A, an electronic device 2810 (for example, a smart phone) is illustrated, where the electronic device 2810 may include various sizes or shapes of displays and may be mounted on a frame of a wearable device 2820. As illustrated in FIG. 28A, the electronic device 2810 is horizontally inserted into the wearable device 2820.

Referring to FIG. 28B, an electronic device 2810 is illustrated, where the electronic device 2810 may be vertically mounted on the frame of a wearable device 2820. For example, the same electronic device 2810 may be mounted on a different type wearable device 2820 or may be mounted on the same wearable device 2820 in a different direction, as illustrated in FIGS. 28A and 28B.

When the electronic device 2810 is vertically mounted on the wearable device 2820 as illustrated in FIG. 28B, a plurality of lenses or openings located on the frame of the wearable device 2820 may exceed a horizontal length of the electronic device 2810, so that a normal HMT mode screen cannot be provided.

According to an embodiment of the present disclosure, at least some of the mechanisms within the frame of the wearable device 2820 may be controlled according to the direction in which the electronic device 2810 is mounted on the frame of the wearable device 2820. For example, when the smart phone is mounted vertically, rather than horizontally, positions or magnifications of the lenses (left and right lenses) may be controlled. Further, according to an embodiment of the present disclosure, by forwardly and backwardly controlling the frame of the wearable device 2820 on which the electronic device 2810 is mounted, the wearer of the wearable device 2820 may not be inconvenienced by the screen change.

Figure 29:
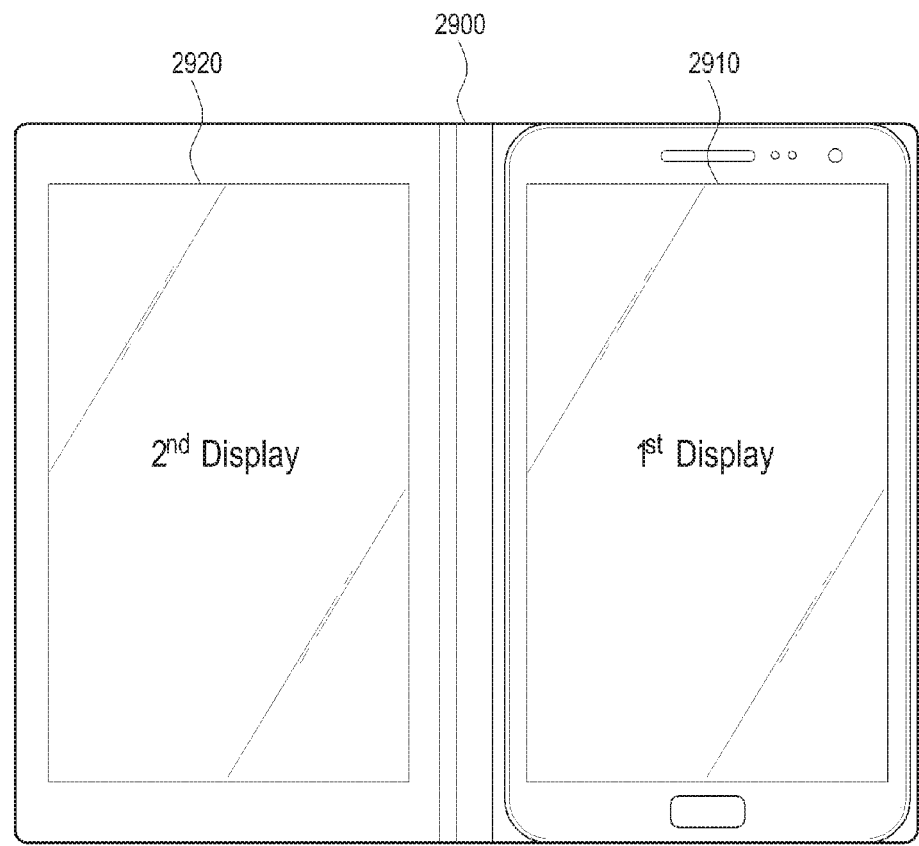
FIG. 29 illustrates an example of an electronic device including a plurality of displays according to an embodiment of the present disclosure.

FIG. 29 illustrates an example of an electronic device including a plurality of displays according to an embodiment of the present disclosure.

Referring to FIG. 29, an electronic device 2900 is illustrated, where the electronic device 2900 may include a plurality of displays (display units) 2910 and 2920. The electronic device 2900 including the plurality of displays 2910 and 2920 is referred to as a dual display electronic device for convenience.

The dual display electronic device 2900 may include most components (for example, a processor, a memory, an input module, a communication module, a sensor module, and the like) for functions of the general electronic device (for example, a smart phone function) within the housing including a first display unit 2910. A second display unit 2920 may be a sub display device and may be located on a cover of the electronic device 2900.

Figure 30:
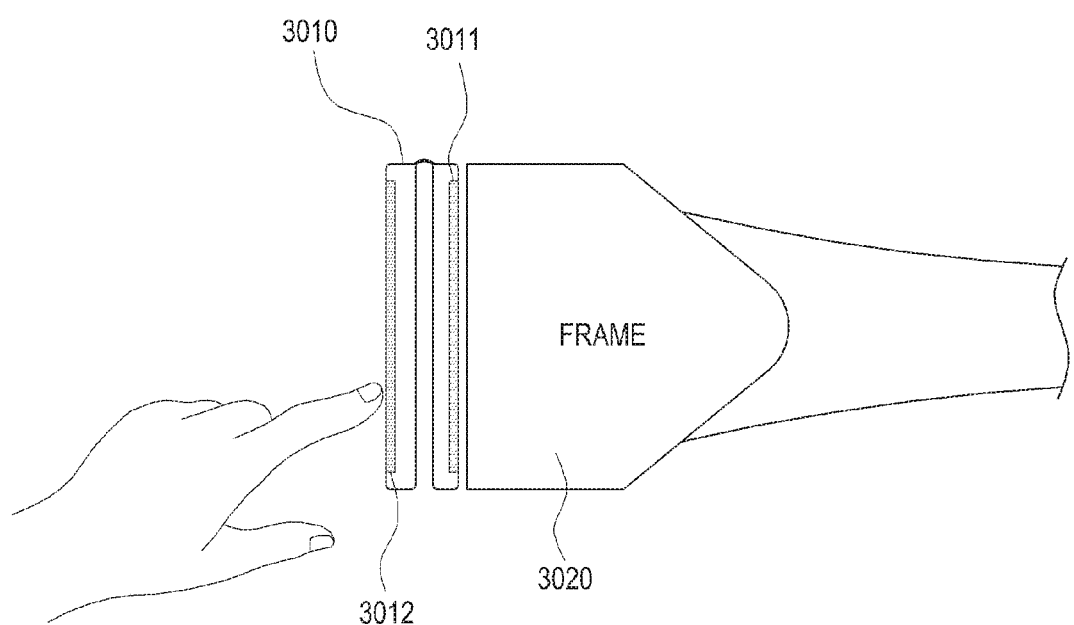
FIG. 30 illustrates an example in which a plurality of displays are mounted on a wearable device according to an embodiment of the present disclosure.

FIG. 30 illustrates an example in which a plurality of displays are mounted on a wearable device according to an embodiment of the present disclosure.

Referring to FIG. 30, a dual display electronic device 3010 is illustrated, where the dual display electronic device 3010 may be mounted on a frame of a wearable device 3020. According to an embodiment of the present disclosure, a first display unit 3011 of the dual display electronic device 3010 mounted on the wearable device 3020 may be mounted to contact with an opening of the frame in order to display a screen corresponding to the HMT mode.

Further, a second display unit 3012 of the dual display electronic device 3010 may be configured to be used for general functions of the dual display electronic device 3010, or may be configured to be used for a function of controlling the screen corresponding to the HMT mode provided through the first display unit 3011 according to an embodiment of the present disclosure. For example, the first display unit 3011 may be implemented to provide a function corresponding to the first screen area in the aforementioned electronic devices, and the second display unit 3012 may be implemented to provide a function corresponding to the second screen area in the aforementioned electronic devices. The dual display electronic device 3010 may be implemented to perform a touch input function, a gesture recognition function, and an illumination recognition function through the second display unit 3012.

Hereinafter, an implementation example of a first device (for example, an electronic device) or a second device (for example, a wearable device) will be described with reference to FIGS. 31 to 33.

Figure 31:
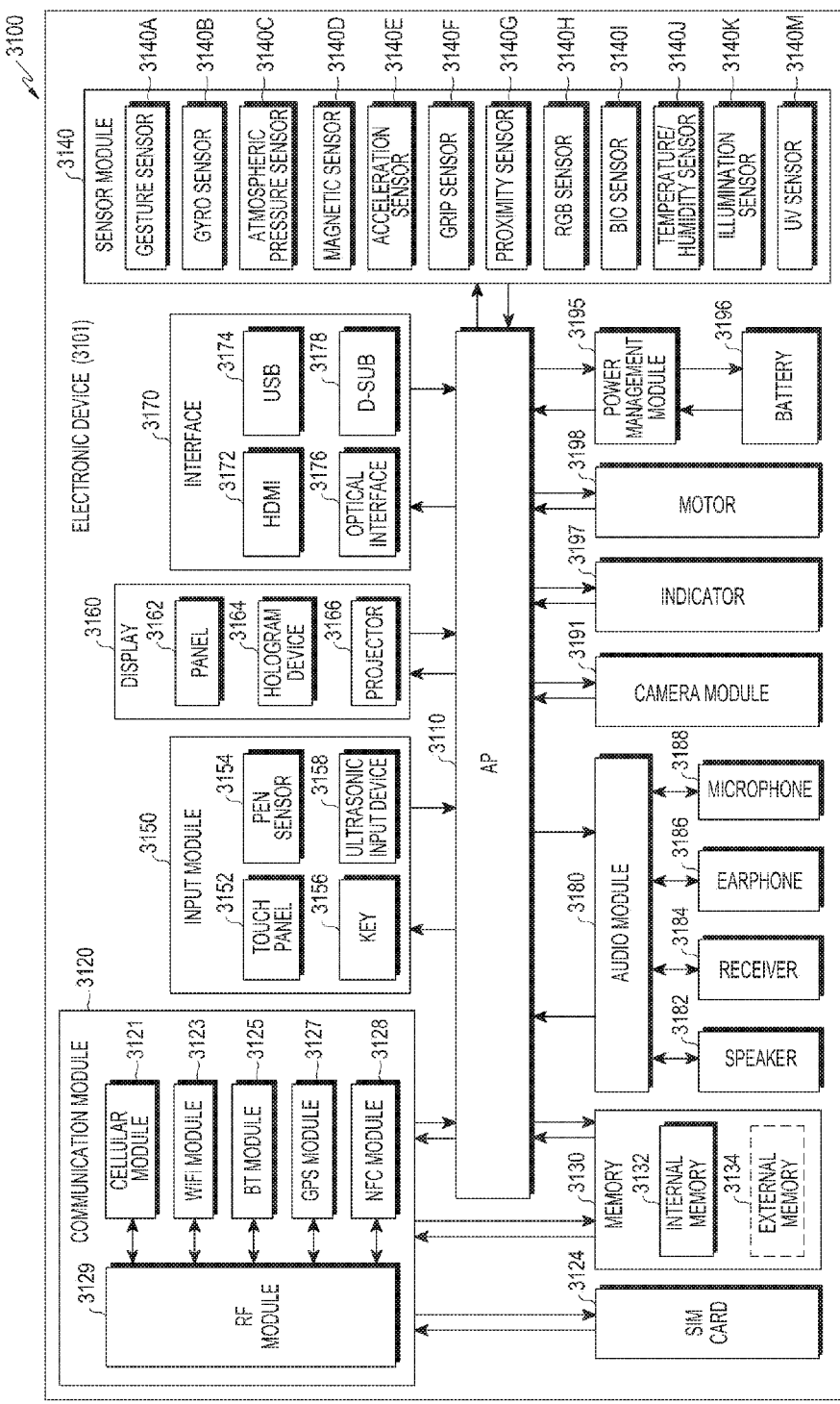
FIG. 31 is a block diagram illustrating a detailed structure of an electronic device according to an embodiment of the present disclosure.
Figure 32:
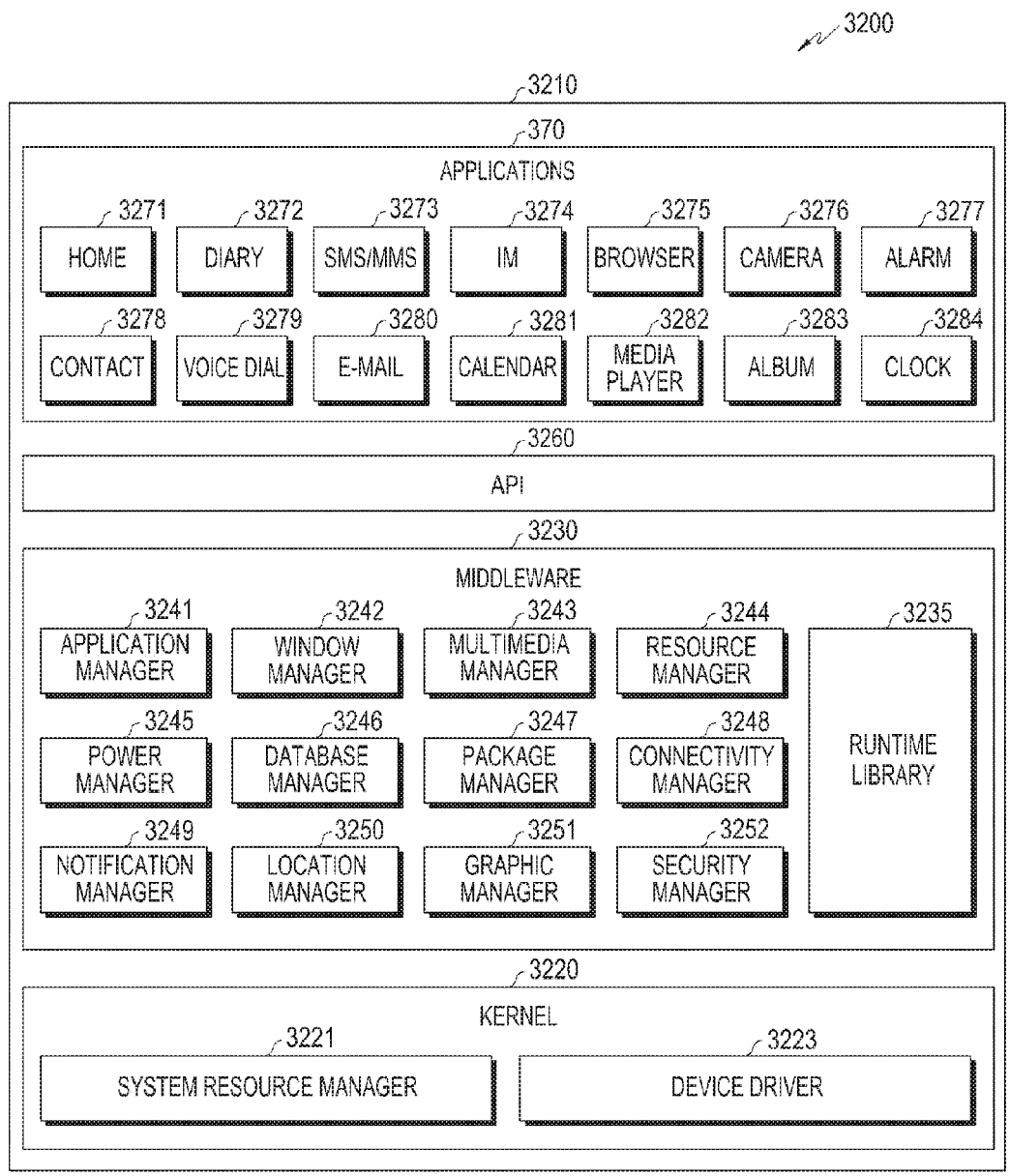
FIG. 32 is a block diagram of a programming module according to an embodiment of the present disclosure.

FIG. 31 is a block diagram illustrating a detailed structure of an electronic device according to an embodiment of the present disclosure, and FIG. 32 is a block diagram of a programming module according to an embodiment of the present disclosure.

Referring to FIG. 31, a block diagram 3100 of an electronic device 3101 is illustrated. The electronic device 3101 may include, for example, all or some of the electronic device 101 illustrated in FIG. 1. The electronic device 3101 may include at least one AP 3110, a communication module 3120, a Subscriber Identification Module (SIM) card 3124, a memory 3130, a sensor module 3140, an input module (device) 3150, a display 3160, an interface 3170, an audio module 3180, a camera module 3191, a power management module 3195, a battery 3196, an indicator 3197, and a motor 3198.

The AP 3110 may control a plurality of hardware or software components connected thereto by driving an operating system or an application program and perform a variety of data processing and calculations. The AP 3110 may be implemented by, for example, a System on Chip (SoC). According to one embodiment, the AP 3110 may further include a Graphic Processing Unit (GPU) and/or an image signal processor. The AP 3110 may also include at least some (for example, a cellular module 3121) of the components illustrated in FIG. 31. The AP 3110 may load instructions or data, received from at least one other element (for example, a non-volatile memory), in a volatile memory to process the loaded instructions or data and may store various types of data in a non-volatile memory.

The communication module 3120 may have a component equal or similar to the communication interface 170 of FIG. 1. The communication module 3120 may include, for example, the cellular module 3121, a Wi-Fi module 3123, a BT module 3125, a GPS module 3127, an NFC module 3128, and a Radio Frequency (RF) module 3129.

The cellular module 3121 may provide a voice call, an image call, a short message service (SMS), or an Internet service through, for example, a communication network. According to one embodiment, the cellular module 3121 may distinguish between and authenticate electronic devices within a communication network by using a SIM (for example, the SIM card 3124). According to one embodiment, the cellular module 3121 may perform at least some functions that the AP 3110 may provide. According to one embodiment, the cellular module 3121 may include a CP.

Each of the Wi-Fi module 3123, the BT module 3125, the GPS module 3127, and the NFC module 3128 may include, for example, a processor for processing data transmitted/received through the corresponding module. According to some embodiments, at least some (for example, two or more) of the cellular module 3121, the WiFi module 3123, the BT module 3125, the GPS module 3127, and the NFC module 3128 may be included in one IC or IC package.

The RF module 3129 may transmit/receive, for example, a communication signal (for example, an RF signal). The RF module 3129 may include, for example, a transceiver, a Power Amp Module (PAM), a frequency filter, a Low Noise Amplifier (LNA), or an antenna. According to an embodiment, at least one of the cellular module 3121, the Wi-Fi module 3123, the BT module 3125, the GPS module 3127, and the NFC module 3128 may transmit/receive an RF signal through a separate RF module.

The SIM card 3124 may include, for example, a card including a SIM and/or an embedded SIM, and may further include unique identification information (for example, an Integrated Circuit Card Identifier (ICCID)) or subscriber information (for example, International Mobile Subscriber Identity (IMSI)).

The memory 3130 may include, for example, an internal memory 3132 or an external memory 3134. The internal memory 3132 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 3134 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 3134 may be functionally and/or physically connected to the electronic device 3101 through various interfaces.

The sensor module 3140 may measure a physical quantity or detect an operational state of the electronic device 3101, and may convert the measured or detected information into an electrical signal. The sensor module 3140 may include, for example, at least one of a gesture sensor 3140A, a gyro sensor 3140B, an atmospheric pressure sensor 3140C, a magnetic sensor 3140D, an acceleration sensor 3140E, a grip sensor 3140F, a proximity sensor 3140G, a color sensor 3140H (for example, a Red, Green, Blue (RGB) sensor), a biometric (e.g., bio) sensor 31701, a temperature/humidity sensor 3140J, an illumination sensor 3140K, and an ultraviolet (UV) sensor 3140M.

Additionally or alternatively, the sensor module 3140 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 3140 may further include a control circuit for controlling at least one sensor included therein. In some embodiments, the electronic device 3101 may further include a processor that is configured as a part of the AP 3110 or a separate element from the AP 3110 to control the sensor module 3140, thereby controlling the sensor module 3140 while the AP 3110 is in a sleep state.

The input module 3150 may include, for example, a touch panel 3152, a (digital) pen sensor 3154, a key 3156, and/or an ultrasonic input device 3158. The touch panel 3152 may use at least one of, for example, a capacitive type, a resistive type, an infrared type, and an ultrasonic type. The touch panel 3152 may further include a control circuit. The touch panel 3152 may further include a tactile layer and provide a tactile reaction to the user.

The (digital) pen sensor 3154 may include, for example, a recognition sheet which is a part of the touch panel or a separate recognition sheet. The key 3156 may include, for example, a physical button, an optical key or a keypad. The ultrasonic input device 3158 may identify data by detecting an acoustic wave with a microphone (for example, a microphone 3188) of the electronic device 3101 through an input unit for generating an ultrasonic signal.

The display 3160 (for example, the display 160 of FIG. 1) may include a panel 3162, a hologram device 3164, and/or a projector 3166. The panel 3162 may include the same or similar configuration to the display 160 illustrated in FIG. 1. The panel 3162 may be implemented to be, for example, flexible, transparent, or wearable. The panel 3162 may also be configured as one module together with the touch panel 3152. The hologram device 3164 may show a stereoscopic image in the air using interference of light. The projector 3166 may project light onto a screen to display an image. For example, the screen may be located inside or outside the electronic device 3101. According to one embodiment, the display 3160 may further include a control circuit for controlling the panel 3162, the hologram device 3164, or the projector 3166.

The interface 3170 may include, for example, a High-Definition Multimedia Interface (HDMI) 3172, a Universal Serial Bus (USB) 3174, an optical interface 3176, or a D-subminiature (D-sub) 3178. The interface 3170 may be included in, for example, the communication interface 170 illustrated in FIG. 1. Additionally or alternatively, the interface 3170 may include, for example, a Mobile High-definition Link (MHL) interface, a Secure Digital (SD) card/Multi-Media Card (MMC) interface, or an Infrared Data Association (IrDA) standard interface.

The audio module 3180 may bilaterally convert, for example, a sound and an electrical signal. At least some components of the audio module 3180 may be included in, for example, the input/output interface 150 illustrated in FIG. 1. The audio module 3180 may process voice information input or output through, for example, a speaker 3182, a receiver 3184, an earphone 3186, and/or the microphone 3188.

The camera module 3191 may capture, for example, a still image or a moving image, and according to one embodiment, may include one or more image sensors (for example, a front sensor or a rear sensor), a lens, an Image Signal Processor (ISP), or a flash (for example, an LED or a xenon lamp).

The power management module 3195 may manage, for example, power of the electronic device 3101. According to one embodiment, the power management module 3195 may include a Power Management Integrated Circuit (PMIC), a charger Integrated Circuit (IC), or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining amount of battery 3196, a voltage, current, or temperature during charging. The battery 3196 may include, for example, a rechargeable battery or a solar battery.

The indicator 3197 may indicate a particular status of the electronic device 3101 or a part thereof (for example, the AP 3110), for example, a booting status, a message status, a charging status, or the like. The motor 3198 may convert an electrical signal into mechanical vibrations, and may generate a vibration or haptic effect. Although not illustrated, the electronic device 3101 may include a processing unit (for example, a GPU) for supporting mobile TV. The processing unit for supporting mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on the type of the electronic device. The electronic device according to the present disclosure may include one or more of the aforementioned components or may further include other additional components, or some of the aforementioned components may be omitted. Further, some of the elements of the electronic device according to an embodiment of the present disclosure may be coupled to form a single entity while performing the same functions as those of the corresponding elements before the coupling.

Referring to FIG. 32, a block diagram 3200 of a program module 3210 is illustrated.

According to one embodiment, the program module 3210 (for example, the program 140 of FIG. 1) may include an Operating System (OS) for controlling resources related to the electronic device (for example, the electronic device 101 of FIG. 1) and/or various applications (for example, the application program 147 of FIG. 1) executed in the operating system. The operating system may be, for example, Android, iOS, Windows, Symbian, Tizen, Bada, or the like.

The program module 3210 may include a kernel 3220, a middleware 3230, an Application Programming Interface (API) 3260, and/or applications 3270. At least some of the program module 3210 may be preloaded in an electronic device or downloaded from a server (for example, the server 106 of FIG. 1).

The kernel 3220 (for example, the kernel 141 of FIG. 1) may include, for example, a system resource manager 3221 and/or a device driver 3223. The system resource manager 3221 may control, allocate, or collect the system resources. According to one embodiment, the system resource manager 3221 may include a process management unit, a memory management unit, or a file system management unit. The device driver 3223 may include, for example, a display driver, a camera driver, a BT driver, a shared-memory driver, a USB driver, a keypad driver, a Wi-Fi driver, an audio driver, and/or an Inter-Process Communication (IPC) driver.

The middleware 3230 may provide a function required by the applications 3270 in common or provide various functions to the applications 3270 through the API 3260 so that the applications 3270 can efficiently use limited system resources of the electronic device. According to one embodiment, the middleware 3230 (for example, the middleware 143 of FIG. 1) may include, for example, at least one of a run time library 3235, an application manager 3241, a window manager 3242, a multimedia manager 3243, a resource manager 3244, a power manager 3245, a database manager 3246, a package manager 3247, a connectivity manager 3248, a notification manager 3249, a location manager 3250, a graphic manager 3251, and a security manager 3252.

The run time library 3235 may include, for example, a library module that a compiler uses in order to add new functions through a programming language while the applications 3270 are executed. The run time library 3235 may perform input/output management, memory management, or a function for an arithmetic function.

For example, the application manager 3241 may manage a life cycle of at least one of the applications 3270. The window manager 3242 may manage GUI resources used on the screen. The multimedia manager 3243 may detect a format required for reproducing various media files and encode or decode a media file using a codec appropriate for the corresponding format. The resource manager 3244 may manage resources, such as a source code, a memory, or a storage space of at least one of the applications 3270.

The power manager 3245 may operate together with a Basic Input/Output System (BIOS) to manage a battery or power and may provide power information required for the operation of the electronic device. The database manager 3246 may generate, search for, or change a database to be used by at least one of the applications 3270. The package manager 3247 may manage the installation or the updating of applications distributed in a package file form.

For example, the connectivity manager 3248 may manage wireless connections, such as Wi-Fi or BT. The notification manager 3249 may display or notify an event, such as a received message, an appointment, and a proximity notification, to a user without disturbance. The location manager 3250 may manage location information of the electronic device. The graphic manager 3251 may manage graphic effects to be provided to a user and user interfaces related to the graphic effects. The security manager 3252 may provide various security functions required for system security or user authentication. According to one embodiment, when the electronic device (for example, the electronic device 101 of FIG. 1) has a telephone call function, the middleware 3230 may further include a telephony manager for managing a voice or video call function of the electronic device.

The middleware 3230 may a middleware module for forming a combination of various functions of the aforementioned elements. The middleware 3230 may provide modules specialized according to the type of OS in order to provide differentiated functions. In addition, the middleware 3230 may dynamically remove some of the existing components or add new components.

The API 3260 (for example, the API 145 of FIG. 1), which is a set of API programming functions, may include different configurations according to operating systems. For example, with respect to each platform, one API set may be provided in a case of Android or iOS, and two or more API sets may be provided in a case of Tizen.

The applications 3270 (for example, the applications 147 of FIG. 1) may include one or more of a home application 3271, a diary application 3272, an SMS/multimedia message service (MMS) application 3273, an Instant Message (IM) application 3274, a browser application 3275, a camera application 3276, an alarm application 3277, a contact application 3278, a voice dial application 3279, and e-mail application 3280, a calendar application 3281, a media player application 3282, an album application 3283, a clock application 3284, a health care application (not illustrated) (for example, an application for measuring a work rate or blood sugar), and an environmental information application (not illustrated) (for example, an application for providing atmospheric pressure, humidity, or temperature information).

According to one embodiment, the applications 3270 may include an application (hereinafter, referred to as an "information exchange application" for convenience of the description) supporting information exchange between the electronic device (for example, the electronic device 101) and external electronic devices (for example, the electronic devices 102 and 104 as illustrated in FIG. 1). The information exchange application may include, for example, a notification relay application for transmitting specific information to the external electronic device, or a device management application for managing the external electronic device.

For example, the notification relay application may include a function of transferring, to the external electronic device (for example, the electronic device 102 or 104), notification information generated from the other applications of the electronic device (for example, the SMS/MMS application, the e-mail application, the health management application, and the environmental information application). Further, the notification relay application may receive notification information from, for example, the external electronic device and provide the received notification information to the user. For example, the device management application may manage (for example, install, delete, or update) at least one function of the external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to one embodiment, the applications 3270 may include an application (for example, health management application) designated according to attributes (for example, attributes of the electronic device such as the type of electronic device which corresponds to a mobile medical device) of the external electronic device (for example, the electronic device 102 or 104). According to one embodiment, the applications 3270 may include an application received from the external electronic device (for example, the server 106, or the electronic device 102 or 104). According to one embodiment, the applications 3270 may include a preloaded application or a third party application that can be downloaded from a server. The names of the elements of the program module 3210 according to the embodiment illustrated in FIG. 32 may vary depending on the type of operating system.

According to an embodiment, at least some of the programming module 3210 may be implemented in software, firmware, hardware, or a combination of two or more thereof. At least some of the programming module 3210 may be implemented (for example, executed) by, for example, the processor (for example, the AP 3110). At least some of the programming module 3210 may include, for example, a module, a program, a routine, sets of instructions, or a process for performing one or more functions.

Figure 33:
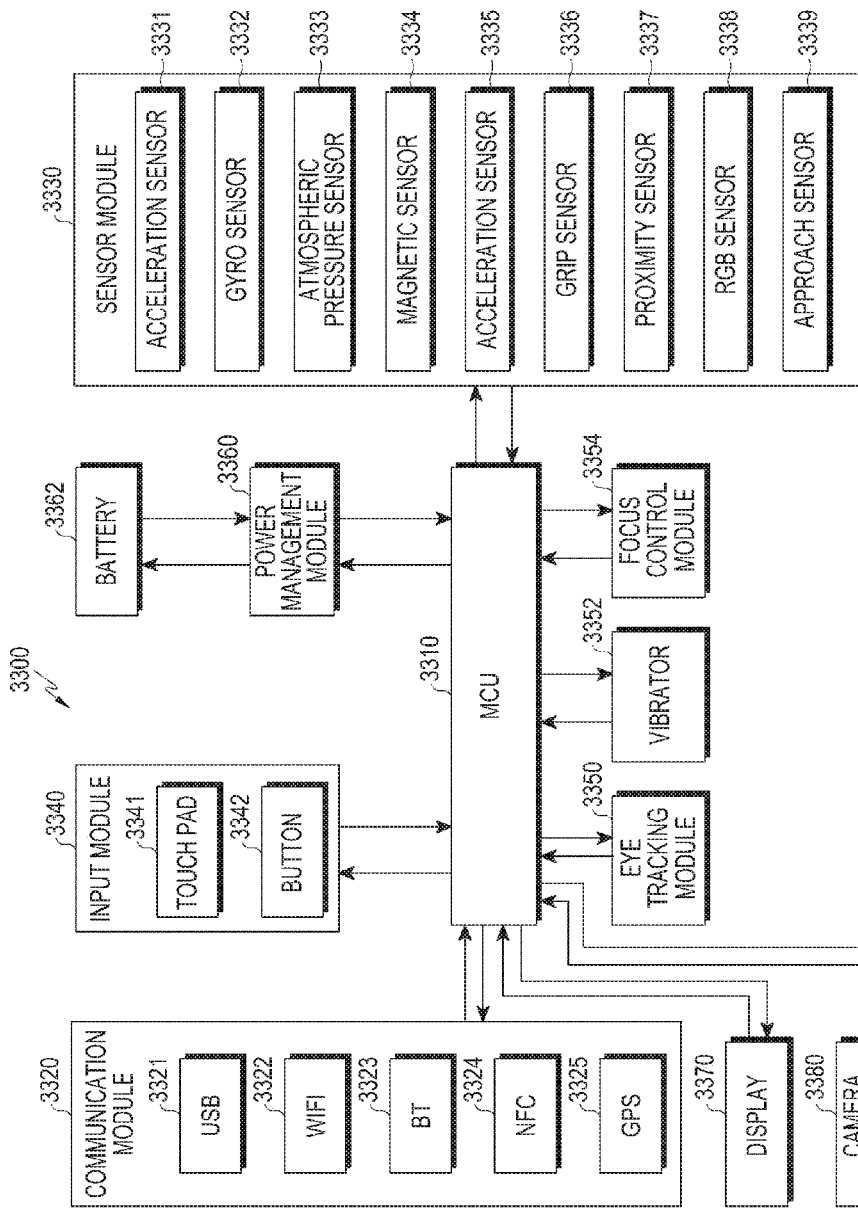
FIG. 33 is a block diagram illustrating a configuration example of a wearable device according to an embodiment of the present disclosure.

FIG. 33 is a block diagram illustrating a configuration example of a wearable device according to an embodiment of the present disclosure.

Referring to FIG. 33, a wearable device 3300 is illustrated, where the wearable device 3300 may provide a wearer with operations equal or similar to those of the electronic device independently described for the mounted display device. The wearable device 3300 may include a multipoint control unit (MCU) 3310, a communication module 3320, a sensor module 3330, an input module 3340, an eye tracking module 3350, a vibrator 3352, a focus control module 3354, a power management module 3360, a battery 3362, a display 3370, and a camera 3380.

The communication module 3320 may include, for example, a USB module 3321, a WiFi module 3322, a BT module 3323, an NFC module 3324, and a GSP module 3325.

The sensor module 3330 may include at least one of, for example, an acceleration sensor 3331, a gyro sensor 3332, an atmospheric pressure sensor 3333, a magnetic sensor 3334, an acceleration sensor 3335, a grip sensor 3336, a proximity sensor 3337, an RGB sensor 3338, and an approach sensor 3339.

The input module 3340 may include a touch pad 3341 and a button 3342.

The wearable device 3300 may include the display 3370 which can be installed to be fixed to a main body instead of having a structure in which the electronic device (for example, the display device) is attached to/detached from the wearable device 3300. The display 3370 may be installed in the main body to provide the user with screens through the lens units illustrated in FIGS. 4 to 6 instead of the display of the mounted electronic device. The display 3370 may display a screen based on an augmented reality operation or a see-through operation according to an embodiment of the present disclosure. The camera 3380 may be installed on the front surface of the main body and photograph the front of the wearer.

The wearable device 3300 may provide the wearer with the augmented reality operation and the see-through operation equal or similar to those of the electronic device independently from the mounted electronic device.

The term "module" or "functional unit" used herein may, for example, mean a unit including one of hardware, software, and firmware or a combination of two or more of them. The "module" may be interchangeably used with, for example, the term "unit," "logic," "logical block," "component," or "circuit." The "module" or "function unit" may be a minimum unit of an integrated component element or a part thereof. The "module" may be a minimum unit for performing one or more functions or a part thereof. The module" or "function unit" may be mechanically or electronically implemented. For example, the "module" or "function unit" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to an embodiment, at least some of the devices (for example, modules or functions thereof) or the method (for example, operations) according to the present disclosure may be implemented by a command stored in a computer-readable storage medium in a programming module form. When he command is executed by one or more processors (for example, the processor 120 of FIG. 1), the one or more processors may execute a function corresponding to the command. The computer-readable storage medium may be, for example, the memory 130 of FIG. 1.

The computer-readable storage medium may include magnetic media, such as a hard disk, a floppy disk and a magnetic tape, optical media, such as a Compact Disc Read Only Memory (CD-ROM) and a DVD, magneto-optical media, such as a floptical disk, and a hardware device specially configured to store and execute a program instruction (for example, a programming module), such as a ROM, a RAM, a flash memory, and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments, a storage medium storing commands is provided. When the commands are executed by one or more processors, one or more operations are performed by the one or more processors. The one or more operations may include: mounting an electronic device on a wearable device and determining a first screen area corresponding to the wearable device among all screen areas of a touch screen included in the electronic device; determining at least some areas of all of the screen areas except for the first screen area as a second screen area; displaying a screen corresponding to the wearable device in the first screen area; and providing one or more functions in the second screen area.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch screen configured to:
      display a screen corresponding to a wearable device, onto which the electronic device is mounted, in a first screen area of an entire screen area; and
      receive an input for controlling the first screen area, in a second screen area, which is different from the first screen area of the entire screen area; and
   a processor configured to:
      determine positions of the first screen area and the second screen area; and
      control one or more operations related to the first screen area and the second screen area,
      wherein the positions of the first screen area and the second screen area are determined, by the processor, by one or more reference points detected by the wearable device onto which the electronic device is mounted, and the one or more reference points are detected from one or more conductive parts arranged on a front surface of the wearable device onto which the electronic device is mounted.

2. The electronic device of claim 1, wherein the first screen area provides a function corresponding to a Head Mounted Theater (HMT) mode.

3. The electronic device of claim 1, wherein the positions of the first screen area and the second screen area are determined, by the processor, by one or more reference points detected by the wearable device onto which the electronic device is mounted.

4. The electronic device of claim 1, wherein the processor is further configured to provide, through the second screen area, one or more functions, which can be provided by the electronic device.

5. The electronic device of claim 1, wherein the processor is further configured to display, in the second screen area, one or more of call reception information, text message reception information, information related to various statuses, weather information, and news information.

6. The electronic device of claim 1, wherein the processor is further configured to provide, through the second screen area, one or more functions for controlling a function corresponding to the first screen area.

7. The electronic device of claim 1, wherein the processor is further configured to display, through the second screen area, information received from an external second electronic device.

8. The electronic device of claim 1, wherein the processor is further configured to apply different screen configurations to the first screen area and the second screen area.

9. The electronic device of claim 8, wherein the screen configurations correspond to one or more of a resolution, a refresh rate, and brightness.

10. The electronic device of claim 1, further comprising:
a sub touch pad in a bezel area adjacent to the touch screen,
wherein the processor is further configured to control one or more functions corresponding to the first screen area in response to a user input through the sub touch pad.

11. The electronic device of claim 1, further comprising:
a first touch screen configured to provide a function corresponding to the first screen area; and
a second touch screen configured to provide a function corresponding to the second screen area.

12. The electronic device of claim 1, wherein the processor is further configured to:
display a stereoscopic view on the first screen area; and
display a monoscopic view on the second screen area.

13. A method of processing a screen area of an electronic device, the method comprising:
mounting the electronic device onto a wearable device;
determining, by a processor, a first screen area corresponding to the wearable device among all screen areas of a touch screen included in the electronic device;
determining at least some areas, of all of the screen areas except for the first screen area, as a second screen area;
displaying a screen corresponding to the wearable device in the first screen area; and
providing one or more functions in the second screen area,
wherein positions of the first screen area and the second screen area are determined, by the processor, by one or more reference points detected by the wearable device onto which the electronic device is mounted, and the one or more reference points are detected from one or more conductive parts arranged on a front surface of the wearable device onto which the electronic device is mounted.

14. The method of claim 13, wherein the first screen area provides a function corresponding to a Head Mounted Theater (HMT) mode.

15. The method of claim 13, further comprising:
providing, through the second screen area, one or more functions, which can be provided by the electronic device.

16. The method of claim 13, further comprising:
displaying, in the second area, one or more of call reception information, text message reception information, information regarding various statuses, weather information, and news information.

17. The method of claim 13, further comprising:
providing, through the second screen area, one or more functions for controlling a function corresponding to the first screen area.

18. The method of claim 13, further comprising:
receiving information from an external second electronic device; and
displaying the received information through the second screen area.

19. The method of claim 13, wherein screen configurations applied to the first screen area and the second screen area are different.

20. The method of claim 19, wherein the screen configurations correspond to one or more of a resolution, a refresh rate, and brightness.

21. The method of claim 13, further comprising:
receiving a user input through a sub touch pad arranged in a bezel area adjacent to the touch screen; and
executing one or more functions corresponding to the first screen area in response to the user input through the sub touch pad.

* * * * *